United States Patent
Okimura et al.

(10) Patent No.: US 9,719,578 B2
(45) Date of Patent: Aug. 1, 2017

(54) GEAR DEVICE

(71) Applicant: NABTESCO CORPORATION, Tokyo (JP)

(72) Inventors: Takayuki Okimura, Mie (JP); Takashi Naruse, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 106 days.

(21) Appl. No.: 14/743,450

(22) Filed: Jun. 18, 2015

(65) Prior Publication Data

US 2015/0369339 A1 Dec. 24, 2015

(30) Foreign Application Priority Data

Jun. 24, 2014 (JP) ................. 2014-129322

(51) Int. Cl.
F16H 1/32 (2006.01)

(52) U.S. Cl.
CPC ......... F16H 1/32 (2013.01); F16H 2001/323 (2013.01)

(58) Field of Classification Search
None
See application file for complete search history.

(56) References Cited

U.S. PATENT DOCUMENTS

2002/0155915 A1 10/2002 Tanaka

FOREIGN PATENT DOCUMENTS

| JP | 2002-317857 A | 10/2002 |
| JP | 2010-101366 A | 5/2010 |

Primary Examiner — Ramya Burgess
Assistant Examiner — Timothy M Hannon
(74) Attorney, Agent, or Firm — Pillsbury Winthrop Shaw Pittman LLP

(57) ABSTRACT

A gear device is provided with a crankshaft including a shaft main body and an eccentric portion, a linking member including external teeth and configured to transmit the rotation of the input gear to the crankshaft, a carrier configured to rotatably support the crankshaft, an oscillation gear oscillating and rotating, and an outer cylinder including internal teeth engaged with the oscillation gear. The carrier and the outer cylinder are configured to concentrically relatively rotate according to the rocking rotation of the oscillation gear. The linking member is configured to selectively take a first position where the external teeth are engaged with a first input gear and a second position where the external teeth are engaged with a second input gear.

7 Claims, 16 Drawing Sheets

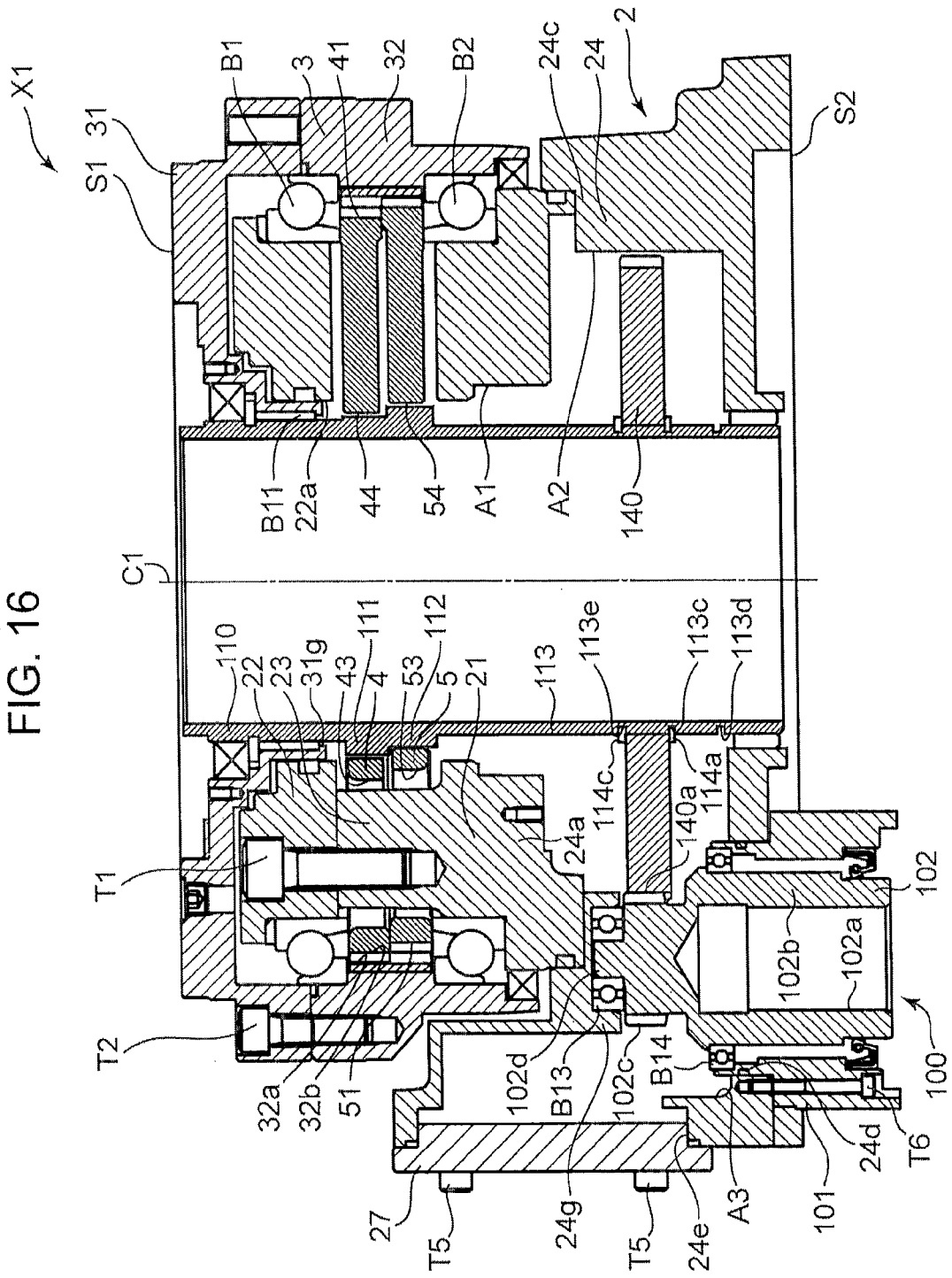

GEAR DEVICE

TECHNICAL FIELD

The present invention relates to a gear device in which either one of a first input gear and a second input gear is selectively mounted as an input gear.

BACKGROUND ART

A speed reducer with an intermediate gear including a large gear and a small gear, an eccentric body shaft including a transmission gear engaged with the small gear and an eccentric body, a supporting body configured to support the eccentric body shaft, an external gear configured to rockingly rotate according to the rotation of the eccentric body and an internal gear engaged with the external gear is described as a conventional gear device in patent literature 1 (see Japanese Unexamined Patent Publication No. 2002-317857). This speed reducer is provided with a torque input unit including a motor having a motor rotary shaft and an input gear member having an input gear engaged with the large gear and coupled to the motor rotary shaft. In this speed reducer, the input gear rotates as a torque is input in a first direction by the motor. Then, the rotation of the input gear is transmitted to the intermediate gear serving as a linking member between the input gear and the eccentric body shaft. In this way, the supporting body rotates about an axial center extending along the first direction.

On the other hand, a gear transmission device with a center gear including a first outer gear and a second outer gear, a crankshaft including an outer gear engaged with the first outer gear and an eccentric body, a carrier configured to support the crankshaft, an external gear configured to rockingly rotate according to the rotation of the eccentric body and an internal gear engaged with the external gear is described in patent literature 2 (see Japanese Unexamined Patent Publication No. 2010-101366). This gear transmission device is provided with a torque input unit including a first shaft having a first bevel gear and coupled to an output shaft of a motor and a second shaft having a second bevel gear engaged with the first bevel gear and an input gear engaged with the second outer gear. In this gear transmission device, a torque input in a second direction intersecting with a first direction by the motor is converted into a torque of the first direction by the first and second shafts, whereby the input gear rotates. Then, the rotation of the input gear is transmitted to the center gear serving as a linking member between the input gear and the crankshaft. In this way, the carrier rotates about an axial center extending along the first direction.

As described above, the speed reducer of patent literature 1 and the gear transmission device of patent literature 2 differ from each other in the structure of the torque input unit. Thus, when these torque input units are selectively mounted in a single gear device and used, dedicated linking members corresponding to the respective torque input units are necessary. Specifically, in the torque input units having mutually different structures, the arrangement of the input gear is mutually different when the torque input unit is mounted in the gear device. Thus, it is necessary to prepare dedicated linking members having shapes corresponding to the arrangements of the respective input gears. Therefore, the number of components is increased.

SUMMARY OF INVENTION

The present invention was developed in view of the above point and aims to provide a gear device capable of changing the arrangement of an input gear while suppressing an increase in the number of components.

The present invention is directed to a gear device in which either one of a first input gear and a second input gear is selectively mounted as an input gear and which is provided with a crankshaft including a shaft main body and an eccentric portion eccentric with respect to an axial center of the shaft main body; a linking member including external teeth and configured to transmit the rotation of the input gear to the crankshaft; a carrier configured to rotatably support the crankshaft; an oscillation gear oscillating and rotating due to rotation of the eccentric portion; and an outer cylinder including internal teeth engaged with the oscillation gear, wherein: the carrier and the outer cylinder are coaxially and relatively rotate due to oscillation and rotation of the oscillation gear; and the linking member is disposed in either one of a first position where the external teeth are engaged with the first input gear mounted in the gear device and a second position where the external teeth are engaged with the second input gear mounted in the gear device.

BRIEF DESCRIPTION OF DRAWINGS

FIG. 16 is a sectional view showing a schematic configuration of the gear device according to the sixth modification in which the linking member is arranged in the second position.

DESCRIPTION OF EMBODIMENT

Figure 1:
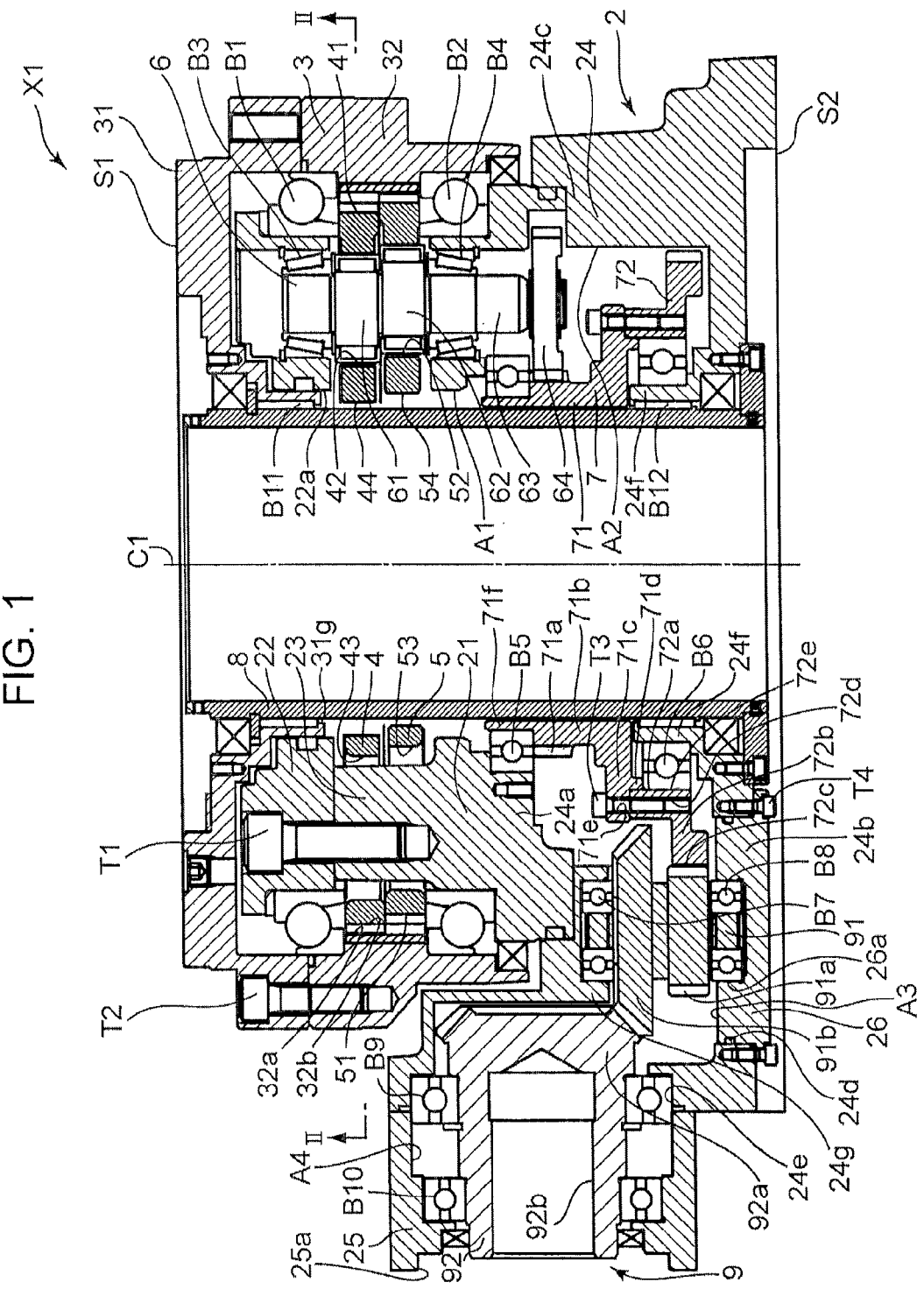
FIG. 1 is a sectional view showing a schematic configuration of a gear device according to an embodiment in which a linking member is arranged in a first position.

Hereinafter, one embodiment of the present invention is described with reference to the drawings. Note that the following embodiment is a specific example of the present invention and not of the nature to limit the technical scope of the present invention.

Further, each drawing to be referred to below shows only main members in a simplified manner out of constituent members of a gear device X1 according to this embodiment for convenience of description. Accordingly, the gear device X1 according to this embodiment can include arbitrary constituent members not shown in the drawings to be referred to in this specification.

Figure 2:
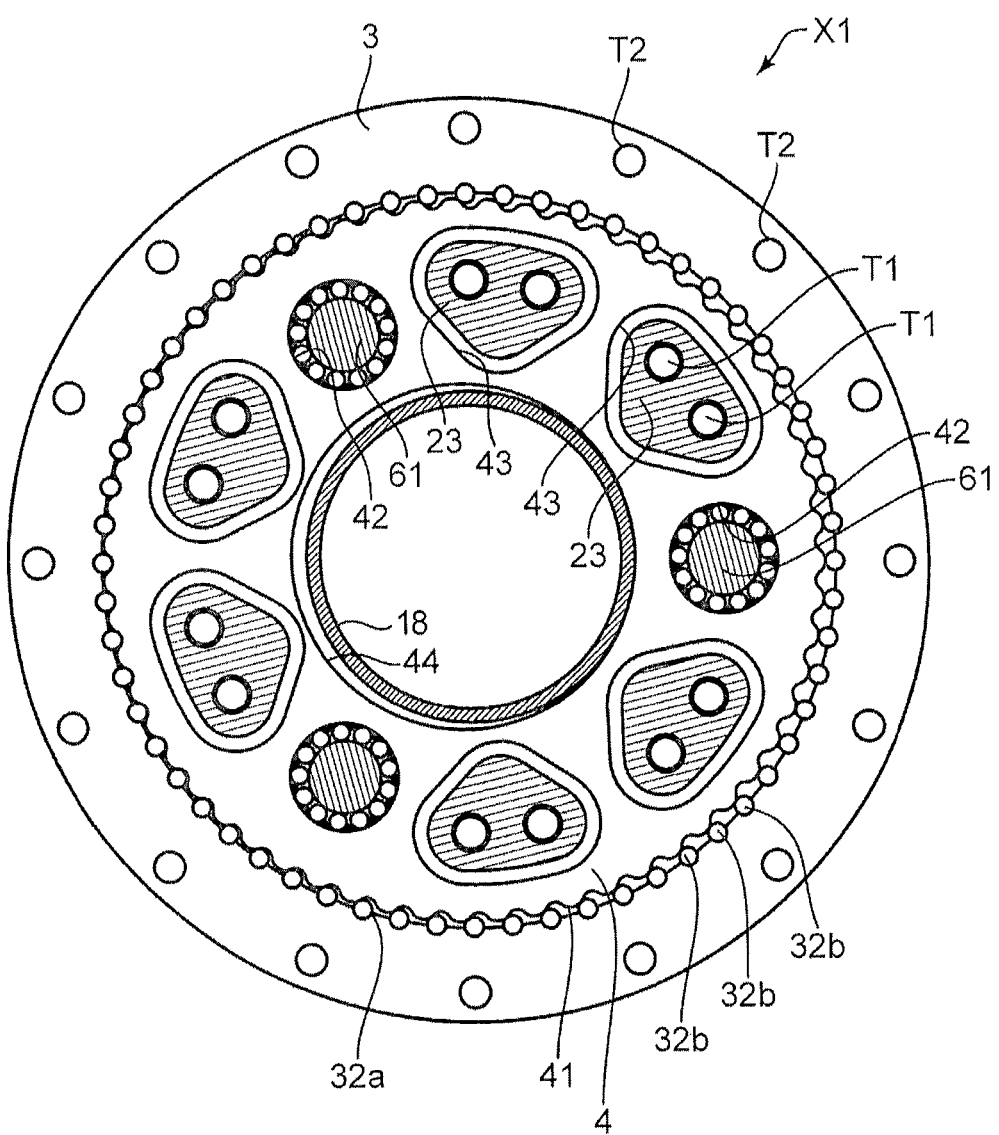
FIG. 2 is a sectional view along line II-II of FIG. 1.

As shown in FIGS. 1 and 2, the gear device X1 is mainly provided with a carrier 2, an outer cylinder 3, oscillation gears 4, 5, crankshafts 6, a linking member 7, a cylindrical body 8 and a torque input unit 9 including an axial direction conversion unit 91 and an input shaft 92.

The carrier 2 is a fixed-side member in the gear device X1 according to this embodiment. The carrier 2 is arranged with a center axis C1 of the gear device X1 as an axial center. The carrier 2 is provided with a base portion 21, an end plate 22 and a plurality of shafts 23. In this embodiment, the base portion 21 and each shaft 23 are integrally formed. Further, the end plate 22 is formed separately from the base portion 21 and each shaft 23 and fastened to each shaft 23 by a plurality of first fastening members T1.

The base portion 21 functions as a base part of the carrier 2. The base portion 21 is facing the end plate 22 across the oscillation gears 4, 5 in a direction of the center axis C1. The base portion 21 includes a main body portion 24 and a bulging portion 25 radially bulging out from the main body portion 24.

Parts of the crankshafts 6, the linking member 7, a part of the cylindrical body 8 and the axial direction conversion unit 91 of the torque input unit 9 are accommodated in the main body portion 24. Specifically, the main body portion 24 is formed with a first space A1, a second space A2, a third space A3 and crankshaft holes. The first space A1 is a space penetrating through a central part of the main body portion 24 in the direction of the center axis C1. The cylindrical body 8 is partly accommodated in the space A1. The second space A2 is a space circumferentially surrounding the first space A1 in an axial intermediate part of the first space 1A. The linking member 7 provided around the cylindrical body 8 is accommodated in the second space A2. The third space A3 is a space radially extending from the second space A2. The axial direction conversion unit 91 is arranged in the third space A3. The crankshaft holes are holes formed around the first space A1 and extending in the direction of the center axis C1. Shaft main bodies 63 and shaft gears 64 of the crankshafts 6 are accommodated in the crankshaft holes of the main body portion 24.

The main body portion 24 includes one portion 24a, another portion 24b and a lateral portion 24c. The one portion 24a is located at one side of the second space A2 in the direction of the center axis C1 (on the side of the end plate 22 in FIG. 1). The other portion 24b is located at a side opposite to the one portion 24a across the second space A2 in the direction of the center axis C1. The lateral portion 24c circumferentially surrounds the first and second spaces A1 and A2 and couples the one and the other portions 24a, 24b. The third space A3 radially extending from the second space A2 is formed in a part of the lateral portion 24c. In this embodiment, surfaces of the other portion 24b and the lateral portion 24c opposite to the end plate 22 in the direction of the center axis C1 serve as a bottom surface S2 of the gear device X1.

A first opening 24d is formed on the bottom surface S2 of the lateral portion 24c. The third space A3 communicates with the outside of the main body portion 24 through the first opening 24d in the direction of the center axis C1. Further, a second opening 24e is formed on a side surface of the lateral portion 24c. The third space A3 communicates with the outside of the main body portion 24 through the second opening 24e in a radial direction.

Here, the carrier 2 further includes a first lid portion 26. The first lid portion 26 functions to close the first opening 24d on the lateral portion 24c of the main body portion 24. In this embodiment, the first lid portion 26 is fitted into the first opening 24d from the side of the bottom surface S2 in the direction of the center axis C1. An edge part of the lateral portion 24c located around the first opening 24d and a part of the first lid portion 26 are fastened by a fourth fastening member T4. This first lid portion 26 can be removed from the lateral portion 24c by detaching the fourth fastening member T4 from the first lid portion 26 and the lateral portion 24c.

The input shaft 92 of the torque input unit 9 is accommodated in the bulging portion 25. The bulging portion 25 is formed to radially bulge out from the side surface of the lateral portion 24c of the main body portion 24. The bulging portion 25 can be removed from the main body portion 24. The bulging portion 25 is formed with the fourth space A4 communicating with the third space A3 through the second opening 24e of the lateral portion 24c in the main body portion 24. Further, a third opening 25a is formed on a side surface of the bulging portion. In this way, the fourth space A4 communicates with the outside of the bulging portion 25 through the third opening 25a in a direction perpendicular to the center axis C1. The input shaft 92 inserted into the fourth space A4 through the third opening 25a is accommodated into the fourth space A4.

The end plate 22 is facing the base portion 21 across the oscillation gears 4, 5 in the direction of the center axis C1. The end plate 22 includes an end plate through hole 22a and crankshaft holes. The end plate through hole 22a is a hole penetrating through a central part of the end plate 22 in the direction of the center axis C1 and communicates with the first space A1 in the main body portion 24 of the base portion 21. The crankshaft holes of the end plate 22 are holes provided on a peripheral edge part of the end plate 22 and communicates with the crankshaft holes in the main body portion 24 of the base portion 21.

Each shaft 23 extends along axial directions of the base portion 21 and the end plate 22 and connects the one portion 24a of the base portion 21 and the end plate 22. One end of each shaft 23 is connected to the one portion 24a of the main body portion 24 and the other end thereof is fastened to the end plate 22 by the first fastening member T1. Note that although six shafts 23 are arranged in a circumferential direction of the carrier 2 in this embodiment, there is no limitation to this and the number of the shafts 23 is arbitrary.

The oscillation gears 4, 5 are arranged between the one portion 24a of the main body portion 24 in the base portion 21 and the end plate 22 in the direction of the center axis C1. The oscillation gear 4, 5 includes an outer gear 41, 51, a plurality of insertion holes 42, 52, a plurality of insertion holes 43, 53 and an insertion hole 44, 54.

The outer gear 41, 51 has a smoothly continuous wavy shape over the entire circumference of the oscillation gear 4, 5. Each insertion hole 42, 52 allows communication between the crankshaft hole of the main body portion 24 and that of the end plate 22. The shaft 23 is inserted into each insertion hole 43, 53. Each insertion hole 43, 53 has a diameter slightly larger than an outer diameter of each shaft 23. Each insertion hole 44, 54 penetrates through a central part of the oscillation gear 4, 5 in the direction of the center axis C1. Each insertion hole 44, 54 allows communication between the end plate through hole 22a of the end plate 22 and the first space A1 of the main body portion 24. The insertion hole 44, 54 has a diameter slightly larger than an outer diameter of the cylindrical body 8.

The oscillation gears 4, 5 are configured to rockingly rotate at mutually different phases with the center axis C1 as an axial center. Note that although two oscillation gears, i.e. the oscillation gears 4, 5 are adopted in this embodiment, there is no limitation to this and one, three or more oscillation gears may be adopted.

The outer cylinder 3 is a member on a rotation side in the gear device X1 according to this embodiment. The outer cylinder 3 is arranged to cover the end plate 22, the oscillation gears 4, 5 and a part of the one portion 24a in the main body portion 24 from a side opposite to the bottom surface S2 in the direction of the center axis C1. A pair of main bearings B1, B2 separated from each other in the direction of the center axis C1 are arranged between the outer cylinder 3 and the carrier 2 located in the outer cylinder 3. The main bearings B1, B2 allow relative rotation between the carrier 2 and the outer cylinder 3.

The outer cylinder 3 includes one lateral portion 31 and another lateral portion 32. The one and the other lateral portions 31, 32 are fastened to each other by a plurality of second fastening members T2 arranged at equal intervals along a circumferential direction of the outer cylinder 3.

The one lateral portion 31 constitutes an upper surface S1 of the axial direction conversion gear device X1. The one lateral portion 31 is formed with a through hole penetrating through a central part of this one lateral portion 31 in the direction of the center axis C1. This through hole communicates with the first space A1 of the main body portion 24 through the through hole 22a and the insertion holes 44, 54.

The other lateral portion 32 is arranged on a side closer to the bottom surface S2 than the one lateral portion 31 in the direction of the center axis C1 (below the one lateral portion 31 in FIG. 1). The other lateral portion 32 has a tubular shape with a hollow part communicating with a through hole 31g of the one lateral portion 31. The inner peripheral surface of the other lateral portion 32 circumferentially surrounds the oscillation gears 4, 5. The other lateral portion 32 has an inner diameter slightly larger than outer diameters of the oscillation gears 4, 5.

The other lateral portion 32 includes a pin groove 32a formed on the inner peripheral surface thereof and a plurality of inner gear pins 32b.

The pin groove 32a is arranged to extend in the direction of the center axis C1 and has a semicircular cross-sectional shape in a cross-section perpendicular to the center axis direction.

Each inner gear pin 32b is mounted in the pin groove 32a. The number of the inner gear pins 32b is set to be slightly larger than the tooth number of the outer gear 41 and the tooth number of the outer gear 51. The oscillation gears 4, 5 rockingly rotate so that the outer gears 41, 51 are engaged with each inner gear pin 32b, whereby the outer cylinder 3 rotates about the center axis C1 as an axial center.

Each crankshaft 6 causes the oscillation gears 4, 5 to rockingly rotate according to the rotation thereof. Each crankshaft 6 is accommodated in the crankshaft holes of the base portion 21 and the end plate 22 while being inserted through the insertion holes 42, 52 of the oscillation gears 4, 5. An axial center of the crankshaft 6 extends in the direction of the center axis C1. A pair of crank bearings B3, B4 separated from each other in the direction of the center axis C1 are provided between each crankshaft 6 and the carrier 2. The crank bearings B3, B4 allow the crankshaft 6 having the axial center parallel to the center axis C1 to rotate about this axial center. Note that although three crankshafts 6 are arranged in the circumferential direction of the carrier 2 in this embodiment, there is no limitation to this and the number of the crankshafts 6 is arbitrary.

Each crankshaft 6 includes eccentric portions 61, 62, a shaft main body 63 and a shaft gear 64.

The shaft main body 63 is a part constituting the axial center of the crankshaft 6 and extends in the direction of the center axis C1.

Each of the first and second eccentric portions 61, 62 has a cylindrical shape. The first and second eccentric portions 61, 62 are both integrally formed to the shaft main body 63 while being eccentric from an axial center of the shaft main body 63. The first eccentric portion 61 is located in the insertion hole 42 of the oscillation gear 4. The second eccentric portion 62 is located in the insertion hole 52 of the oscillation gear 5. Each of the first and second eccentric portions 61, 62 is eccentric from the axial center of the shaft main body 63 by a predetermined eccentric amount.

The shaft gear 64 is mounted on an axial end part of the shaft main body 63 on the side of the bottom surface S2.

The linking member 7 functions to link the torque input unit 9 and the crankshafts 6. The linking member 7 includes a transmitting portion 71 and an engaging portion 72 formed separately from the transmitting portion 71.

The transmitting portion 71 transmits an input torque from the torque input unit 9 to the crankshafts 6 via the engaging portion 72. The transmitting portion 71 has a hollow shape and is arranged to circumferentially surround the first space A1 of the main body portion 24, in which the cylindrical body 8 is arranged, with the center axis C1 as an axial center. The transmitting portion 71 is accommodated in the second space A2 of the main body portion 24. Note that although the transmitting portion 71 has a hollow shape since the gear device X1 is provided with the cylindrical body 8 penetrating through the gear device X1 in the direction of the center axis C1 in this embodiment, the transmitting portion 71 may have a solid shape if the cylindrical body 8 is not present.

The transmitting portion 71 includes a transmission gear 71a, a first extending portion 71b, a second extending portion 71c, a positioning portion 71d and a projecting portion 71f.

The transmission gear 71a rotates about the center axis C as an axial center. The transmission gear 71a is engaged with the shaft gears 64 of the crankshafts 6.

The first extending portion 71b extends from a radially inner edge part of the transmission gear 71a toward the side of the bottom surface S2 (lower side in FIG. 1) in the direction of the center axis C1.

The second extending portion 71c extends from one end of the first extending portion 71b on the side of the bottom surface S2 in the direction of the center axis C1 toward a radially outer side of the transmitting portion 71.

The positioning portion 71d positions the engaging portion 72. The positioning portion 71d projects from an intermediate part of the second extending portion 71c in a radial direction of the transmitting portion 71 toward the side of the bottom surface S2 (lower side in FIG. 1) along the direction of the center axis C1. The positioning portion 71d is annularly formed to surround the first space A1 in the main body portion 24.

The projecting portion 71f extends from a radially inner edge part of the transmission gear 71a toward the side of the upper surface S1 (upper side in FIG. 1) in the direction of the center axis C1.

The engaging portion 72 has an inner diameter slightly larger than that of the transmitting portion 71. Further, the engaging portion 72 is arranged to circumferentially surround the first space A1 of the main body portion 24, in which the cylindrical body 8 is accommodated, with the center axis C1 as an axial center. In this way, the engaging portion 72 is accommodated in the second space A2 of the main body portion 24.

The engaging portion 72 includes a tubular portion 72a extending in the direction of the center axis C1, a radially extending disc-like portion 72b and external teeth 72c provided on an outer end of the disc-like portion 72b.

The tubular portion 72a corresponds to a first part in the gear device according to the present invention. In the direction of the center axis C1, one end of the tubular portion 72a is located on the side of the bottom surface S2 and the other end thereof is located on the side of the upper surface S1. An inner diameter of the tubular portion 72a is set larger than an outer diameter of the cylindrical body 8. Not that although the hollow tubular portion 72a is adopted as the first part in this embodiment since the gear device X1 includes the cylindrical body 8 penetrating through this gear device X1 in the direction of the center axis C1, a solid cylindrical portion may be adopted as the first part if the cylindrical body 8 is not present.

The disc-like portion 72b corresponds to a second part in the gear device according to the present invention. The disc-like portion 72b is connected to one end of the tubular portion 72a. Specifically, a radially inner end of the disc-like portion 72b is connected to one end of the tubular portion 72a. The disc-like portion 72 extends radially outward from this inner end.

The external teeth 72c are provided on the outer end of the disc-like portion 72b. A plurality of external teeth 72c are provided at equal intervals over the entire circumference of the disc-like portion 72b.

The second extending portion 71c of the transmitting portion 71 is formed with a through hole 71e penetrating through this second extending portion 71c in the direction of the center axis C1. Further, the tubular portion 72a of the engaging portion 72 is formed with a fastening hole 72d penetrating through this tubular portion 72a in the direction of the center axis C1.

The positioning portion 71d positions the engaging portion 72 such that an inner peripheral surface 72e of the tubular portion 72a circumferentially surrounding the first space A1 is in contact with this positioning portion 71d. Specifically, the engaging portion 72 is so positioned that the tubular portion 72a is externally fitted on the annular positioning portion 71d. In a state where relative positions of the transmitting portion 71 and the engaging portion 72 are determined in this way, the through hole 71e of the second extending portion 71c and the fastening hole 72d of the tubular portion 72a communicate in the direction of the center axis C1.

The transmitting portion 71 and the engaging portion 72 are fixed to each other by a third fastening member T3. Specifically, the third fastening member T3 is inserted into the fastening hole 72d from the other end side of the tubular portion 72a through the through hole 71e of the second extending portion 71c. Then, the second extending portion 71c of the transmitting portion 71 and the tubular portion 72a of the engaging portion 72 are fixed to each other by the third fastening member T3.

A pair of bearings B5, B6 separated from each other in the direction of the center axis C1 is provided between the linking member 7 and the carrier 2. The bearings B5, B6 allow the linking member 7 to rotate relative to the carrier 2 with the center axis C1 as an axial center.

The bearing B5 is mounted on a mounting surface of the one portion 24a of the main body portion 24. This mounting surface is a surface of the one portion 24a facing the projecting portion 71f in a direction perpendicular to the center axis C1. In this way, the bearing B5 is arranged between the mounting surface of the one portion 24 and the projecting portion 71f of the transmitting portion 71.

The bearing B6 is arranged in contact with the inner peripheral surface 72e of the tubular portion 72a. Specifically, the bearing B6 is fitted in the tubular portion 72e. The bearing B6 is mounted on a supporting portion 24f formed on the other portion 24b of the main body portion 24. This supporting portion 24f extends in an axial direction in a space between the cylindrical body 8 and the inner peripheral surface 72e of the tubular portion 72a in the engaging portion 72. With the bearing B6 mounted on the supporting portion 24f, the tubular portion 72a is positioned to be externally fitted on the annular positioning portion 71d, whereby the bearing B6 is held in contact with the inner peripheral surface 72e of the tubular portion 72a.

The cylindrical body 8 is accommodated into the first space A1 of the main body portion 24 in the base portion 21 through the through hole of the one lateral portion 31, the end plate through hole 22a of the end plate 22 and the insertion holes 44, 54 of the oscillation gears 4, 5. In this way, the cylindrical body 8 is so arranged that the axial center thereof overlaps with the center axis C1. For example, an unillustrated cable or the like is inserted into this cylindrical body 8.

A pair of bearings B11, B12 separated from each other in the direction of the center axis C1 are provided among the cylindrical body 8, the outer cylinder 3 and the carrier 2. The bearings B11, B12 allow the cylindrical body 8 to rotate about the center axis C1 as the axial center.

The torque input unit 9 is a member to which a torque is input, and functions to transmit an input torque to the linking member 7. The torque input unit 9 includes the input shaft 92 and the axial direction conversion unit 91.

A torque is input to the input shaft 92, for example, from an external motor. The input shaft 92 is accommodated in the fourth space A4 in the bulging portion 25. An axial center of the input shaft 92 extends in a direction perpendicular to the center axis C1. The input shaft 92 is removable from the fourth space A4 through the third opening 25a formed on the side surface of the bulging portion 25.

A pair of bearings B9, B10 separated from each other in an axial direction of the input shaft 92 are provided between the input shaft 92 and the bulging portion 25. The bearings B9, B10 allow the input shaft 92 having the axial center perpendicular to the center axis C1 to rotate about this axial center.

The input shaft 92 includes an input hole 92b and a second bevel gear 92a. An output shaft of an external motor or the like is inserted into the input hole 92b in a direction perpendicular to the center axis C1. The second bevel gear 92a is provided on an end part of the input shaft 92 on the side of the main body portion 24 in the direction perpendicular to the center axis C1.

The axial direction conversion unit 91 converts an axial direction of a torque input to the input shaft 92. The axial direction conversion unit 91 is accommodated in the third space A3 in the main body portion 24. An axial center of the axial direction conversion unit 91 extends in the direction of the center axis C1. The axial direction conversion unit 91 can be removed from the third space A3 through the first opening 24d formed on the lateral portion 24c by removing the first lid portion 26 from the lateral portion 24c.

A pair of bearings B7, B8 separated from each other in an axial direction of the axial direction conversion unit 91 are provided between the axial direction conversion unit 91 and the main body portion 24. Specifically, a first mounting portion 24g is provided on a part of the lateral portion 24c of the main body portion 24 located above the third space A3. The bearing B7 supports one end of the axial direction conversion unit 91 in the direction of the center axis C1 while being mounted on the first mounting portion 24g. Further, the first lid portion 26 located below the third space A3 is provided with a second mounting portion 26a. The bearing B8 supports the other end of the axial direction conversion unit 91 in the direction of the center axis C1 while being mounted on the second mounting portion 26a. The bearings B7, B8 allow the input shaft 92 having the axial center parallel to the center axis C1 to rotate about this axial center.

The axial direction conversion unit 91 includes a first bevel gear 91b and a first input gear 91a.

The first bevel gear 91b rotates about the axial center of the axial direction conversion unit 91. The first bevel gear 91b is engaged with the second bevel gear 92a of the input shaft 92 accommodated in the fourth space A4 through the second opening 24e formed on the side surface of the lateral portion 24c.

The first input gear 91a inputs a torque to the engaging portion 72. The first input gear 91a rotates about the axial center of the axial direction conversion unit 91 similarly to the first bevel gear 91b. The first input gear 91a is located closer to the bottom surface S2 than the first bevel gear 91b in the direction of the center axis C1. The first input gear 91a is engaged with the external teeth 72c of the engaging portion 72 in the linking member 7. Specifically, in the gear device X1 shown in FIGS. 1 and 2, the position of the linking member 7 is so adjusted that the external teeth 72c are engaged with the first input gear 91a.

Specifically, in the gear device X1 shown in FIGS. 1 and 2, the tubular portion 72a is in contact with the second extending portion 71c on the side of the bottom surface S2 in the direction of the center axis C1 and positioned at a position radially in contact with the positioning portion 71d.

In this state, the engaging portion 72 is arranged in such a position that the fastening hole 72d formed in the tubular portion 72a and the through hole 71e formed in the second extending portion 71c overlap and the external teeth 72c are engaged with the first input gear 91a, Then, the transmitting portion 71 and the engaging portion 72 are fastened to each other by the third fastening member T3 inserted into the fastening hole 72d from the other end side of the tubular portion 72a through the through hole 71e. In this way, the linking member 7 is arranged, as a whole, in such a position that the external teeth 72c and the first input gear 91a are engaged. In this embodiment, this position of the linking member 7 is referred to as a "first position".

In the gear device X1 shown in FIGS. 1 and 2, a torque is input to the input shaft 92 in the direction perpendicular to the center axis C1, whereby this input shaft 92 rotates about the axial center perpendicular to the center axis C1. Then, in conjunction with the rotation of the input shaft 92, the axial direction conversion unit 91 rotates about the axial center parallel to the center axis C1. This rotation of the axial direction conversion unit 91 is transmitted from the first input gear 91a to the engaging portion 72, whereby the entire linking member 7 rotates about the center axis C1 as the axial center. This rotation of the linking member 7 is transmitted from the transmission gear 71a of the transmitting portion 71 to the shaft gears 64, whereby the eccentric portions 61, 62 of the crankshafts 6 rockingly rotate. Then, the oscillation gears 4, 5 rockingly rotate according to the rocking rotation of the eccentric portions 61, 62, whereby the outer cylinder 3 rotates about the center axis C1 as the axial center.

Figure 3A:
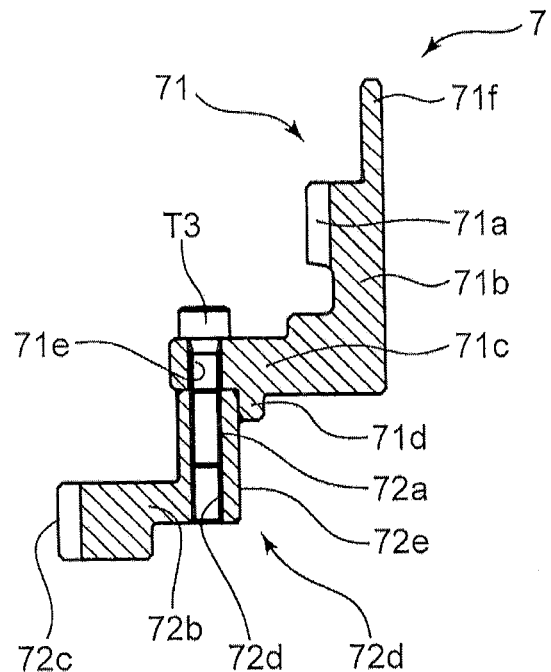
FIG. 3A is an enlarged view of an essential part of the linking member according to the embodiment in a state where an engaging portion is in a first posture and FIG. 3B is an enlarged view of the essential part of the linking member according to the embodiment in a state where the engaging portion is in a second posture.

In the gear device X1 described above, the engaging portion 72 is used in a first posture as shown in FIG. 3A. Specifically, the engaging portion 72 is arranged in the first posture where one end of the tubular portion 72a connected to the inner end of the disc-like portion 72b is located on a side more distant from the second extending portion 71c of the transmitting portion 71 than the other end of the tubular portion 72a in the direction of the center axis C1. By arranging the engaging portion 72 in the first posture, the external teeth 72c are engaged with the first input gear 91a. Specifically, in the gear device X1 shown in FIGS. 1 and 2, the engaging portion 72 is fixed in the first posture to the transmitting portion 71, whereby the entire linking member 7 is arranged in the first position.

Figure 3B:
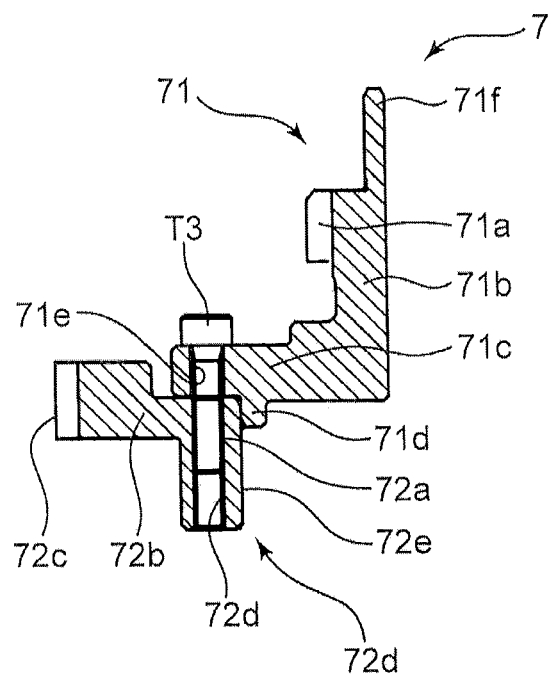

On the other hand, the engaging portion 72 may be used in a second posture as shown in FIG. 3B. In this case, the engaging portion 72 is arranged in the second posture where the one end of the tubular portion 72a connected to the inner end of the disc-like portion 72b is located on a side closer to the second extending portion 71c of the transmitting portion 71 than the other end of the tubular portion 72a in the direction of the center axis C1. The second posture is a posture oriented opposite to the first posture in the direction of the center axis C1. A specific configuration of the gear device X1 in the case of arranging the engaging portion 72 in the second posture is described below.

Figure 4:
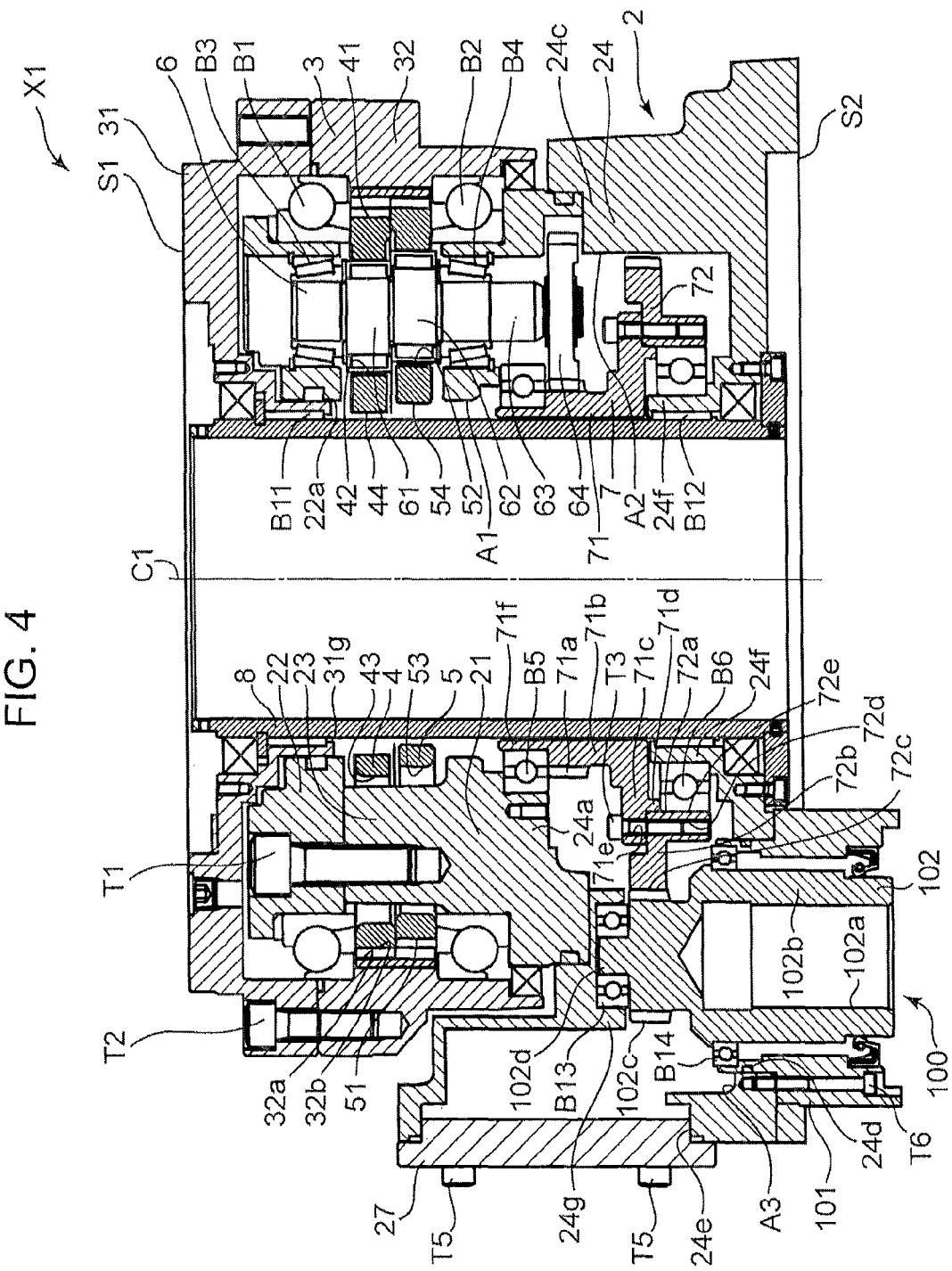
FIG. 4 is a sectional view showing a schematic configuration of the gear device according to the embodiment in which the linking member is arranged in a second position.

A gear device X1 shown in FIG. 4 adopts a second input gear 102c instead of the first input gear 91a shown in FIG. 1 as an input gear mounted in this gear device X1. Specifically, the gear device X1 shown in FIG. 4 is obtained by removing the axial direction conversion unit 91 from the first opening 24d after the first lid portion 26 is removed, removing the bulging portion 25 accommodating the input shaft 92 from the main body portion 24 and mounting a second lid portion 27 and a torque input unit 100 in the gear device X1 shown in FIG. 1.

The second lid portion 27 is in the form of a lid for closing the second opening 24e. The second lid portion 27 is fitted into the second opening 24e in a direction perpendicular to the center axis C1. The second lid portion 27 is fixed to the lateral portion 24c of the main body portion 24 by a fifth fastening member T5.

The torque input unit 100 is a member, to which a torque is input, similarly to the torque input unit 9, and functions to transmit the input torque to the linking member 7. An axial center of the torque input unit 100 extends in the direction of the center axis C1. The torque input unit 100 includes a holding member 101 and an input shaft 102.

The holding member 101 holds the input shaft 102. The holding member 101 has a hollow shape and a part of the input shaft 102 is inserted into this hollow part. The holding member 101 is fitted into the first opening 24d in the center axis direction. The holding member 101 is fixed to the lateral portion 24c by a sixth fastening member T6.

The input shaft 102 includes an input hole 102a, a shaft main body 102b, a second input gear 102c and a tip portion 102d.

An output shaft of a motor or the like is inserted into the input hole 102a from the side of the bottom surface S2 in the direction of the center axis C1.

The shaft main body 102b is a part of the input shaft 102 where the input hole 102a is formed. The shaft main body 102b is accommodated in the hollow part of the holding member 101. An outer diameter of the shaft main body 102b is set slightly smaller than an inner diameter of the holding member 101.

The second input gear 102c rotates about an axial center of the input shaft 102. The second input gear 102c is continuous with the shaft main body 102b and located closer to the upper surface S1 than the shaft main body 102b in the direction of the center axis C1. The second input gear 102c is located in the third space A3 in the lateral portion 24c of the main body portion 24.

As shown in FIGS. 1 and 4, the first input gear 91a and the second input gear 102c are arranged in different positions in the third space A3. Specifically, the second input gear 102c shown in FIG. 4 is arranged closer to the upper surface S1 than the first input gear 91a shown in FIG. 1 in the direction of the center axis C1.

The tip portion 102d is continuous with the second input gear 102c and projects from this second input gear 102c toward the upper surface S1 in the direction of the center axis C1.

A pair of bearings B13, B14 separated from each other in an axial direction of the input shaft 102 are provided among the input shaft 102, the main body portion 24 and the holding member 101. Specifically, the bearing B13 supports the tip portion 102d of the input shaft 102 while being mounted on the first mounting portion 24g of the lateral portion 24c. The bearing B14 supports the shaft main body 102b of the input shaft 102 while being mounted on the inner peripheral surface of the holding member 101. The bearings B13, B14 allow the input shaft 102 having the axial center parallel to the center axis C1 to rotate about this axial center.

Here, since the structure of the torque input unit itself differs between the gear device X1 shown in FIG. 1 and the gear device X1 shown in FIG. 4, the arrangement of the second input gear 102c and that of the first input gear 91a differ as described above. Thus, in the gear device X1 shown in FIG. 4, the posture of the engaging portion 72 of the linking member 7 is changed from the first posture to the second posture.

Specifically, in the gear device X1 shown in FIG. 4, a change from the first posture to the second posture is made by removing the engaging portion 72 in the gear device X1 shown in FIG. 1 from the transmitting portion 71 and inverting the engaging portion 72 in the direction of the center axis C1. Since the external teeth 72c in the second posture are located closer to the upper surface S1 than the external teeth 72c in the first posture in the direction of the center axis C1, they are engaged with the second input gear 102c at this position. As just described, in the gear device X1 shown in FIG. 4, the position of the linking member 7 is so adjusted that the external teeth 72c are engaged with the second input gear 102c.

Specifically, in the gear device X1 shown in FIG. 4, the engaging portion 72 is positioned in the second posture inverted from the first posture in the direction of the center axis C1 and at a position in contact with the second extending portion 71c on the side of the bottom surface S2 in the direction of the center axis C1 and in contact with the positioning portion 71d in the radial direction. In this state, the engaging portion 72 is arranged in such a position that the fastening hole 72d formed in the tubular portion 72a and the through hole 71e formed in the second extending portion 71c overlap and the external teeth 72c are engaged with the first input gear 91a. The transmitting portion 71 and the engaging portion 72 are fastened to each other by the third fastening member T3 inserted into the fastening hole 72d from the one end side of the tubular portion 72a through the through hole 71e. Specifically, the engaging portion 72 is positioned to be arranged in the same fixed position by the positioning portion regardless of whether the engaging portion 72 is in the first posture or in the second posture, and fixed to the transmitting portion 71 in this fixed position. In this way, the linking member 7 is entirely arranged in a position where the external teeth 72c are engaged with the second input gear 102c. In this embodiment, this position of the linking member 7 is referred to as a "second position".

In the gear device X1 shown in FIG. 4, a torque is input to the input shaft 102 in the direction of the center axis C1, whereby this input shaft 102 rotates about the axial center parallel to the center axis. This rotation of the input shaft 102 is transmitted from the second input gear 102c to the engaging portion 72 in the second posture and further transmitted to the outer cylinder 3 via the transmitting portion 71, the crankshafts 6 and the oscillation gears 4, 5.

As described above, in the gear device X1, the linking member 7 is configured to selectively take the first position where the external teeth 72c are engaged with the first input gear 91a and the second position where the external teeth 72c are engaged with the second input gear 102c. Thus, by switching the position of the linking member 7 to either one of the first and second positions according to the torque input unit 9, 100 mounted in the gear device X1, an input torque from the input gear can be transmitted to the crankshafts 6 regardless of whether the input gear is the first input gear 91a or the second input gear 102c. As just described, in the gear device X1, the torque input unit 9, 100 can be switched while an increase in the number of components is suppressed since the linking member 7 can selectively take the position corresponding to either one of the first and second input gears 91a, 102c.

Further, in the gear device X1, the linking member 7 includes the engaging portion 72 and this engaging portion 72 is configured to selectively assume the first and second postures oriented opposite to each other in the center axis direction. Thus, the linking member 7 can be easily switched to either one of the first and second positions only by inverting the posture of the engaging portion 72 in the direction of the center axis C1.

Further, in the gear device X1, the positioning portion 71*d* can position the engaging portion 72 such that the fixed position of the engaging portion 72 to the transmitting portion 71 is the same regardless where the engaging portion 72 assumes the first posture or the second posture. Thus, the linking member 7 can be easily switched from one of the first and second positions to the other.

Further, in the gear device X1, the bearing B6 is fitted in the tubular portion 72*a* to be held in contact with the inner peripheral surface 72*e* of the tubular portion 72*a*. This enables the bearing B6 to rotatably support the linking member 7.

Further, in the gear device X1, the positioning portion 71*d* positions the engaging portion 72 in such a manner as to be held in contact with the inner peripheral surface 72*e* of the tubular portion 72*a*, wherefore the inner peripheral surface 72*e* of the tubular portion 72*a* can be accurately positioned. In this way, relative positions of the inner peripheral surface 72*e* of the tubular portion 72*a* and the bearing B6 held in contact with the inner peripheral surface 72*e* can be accurately determined.

Note that although the linking member 7 is configured to selectively take the first and second positions by arranging the engaging portion 72 in either one of the first and second postures in this embodiment, there is no limitation to this. For example, the linking member 7 may be configured to selectively take the first and second positions, for example, by appropriately changing the fixed position of the engaging portion 72 to the transmitting portion 71 as in a first modification shown in FIGS. 5 and 6.

Figure 5:
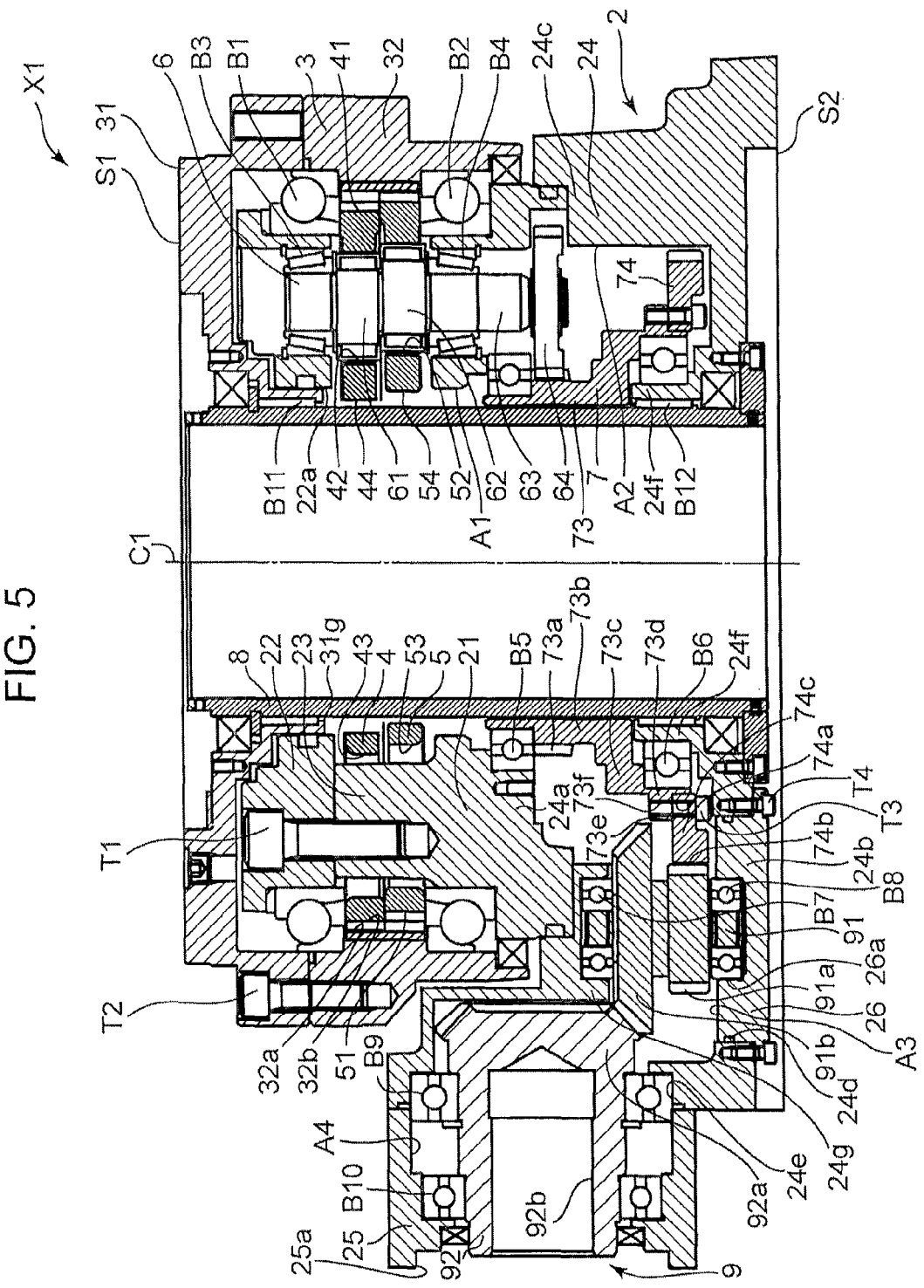
FIG. 5 is a sectional view showing a schematic configuration of a gear device according to a first modification in which the linking member is arranged in the first position.
Figure 6:
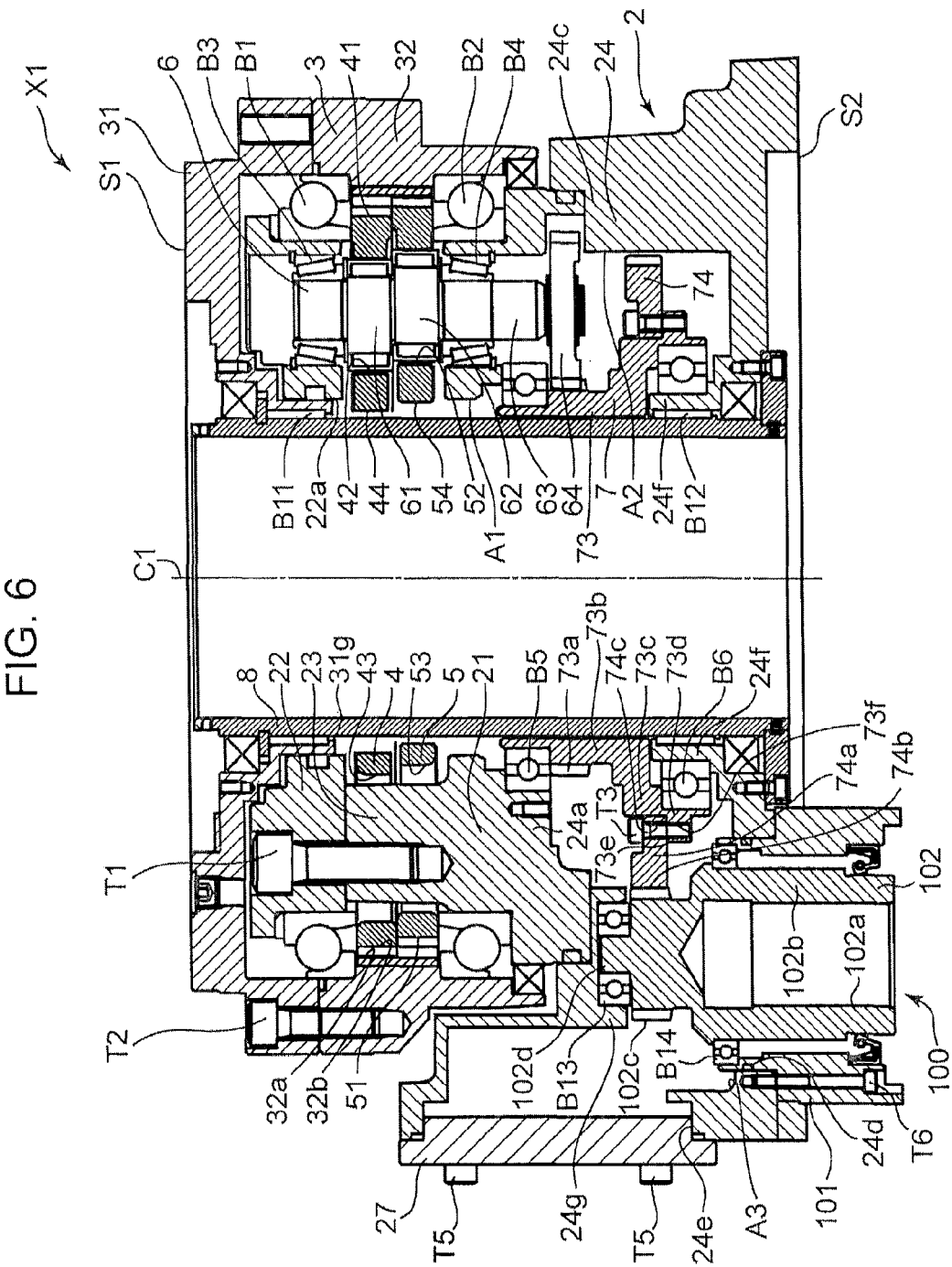
FIG. 6 is a sectional view showing a schematic configuration of the gear device according to the first modification in which the linking member is arranged in the second position.

In the first modification shown in FIGS. 5 and 6, a transmitting portion 73 and an engaging portion 74 are provided instead of the transmitting portion 71 and the engaging portion 72.

The transmitting portion 73 includes a transmission gear 73*a*, a third extending portion 73*b*, a fourth extending portion 73*c*, a fifth extending portion 73*d* and a sixth extending portion 73*e*.

The transmission gear 73*a* rotates about the center axis C as an axial center. The transmission gear 73*a* is engaged with the shaft gears 64 of the crankshafts 6.

The third extending portion 73*b* extends from a radially inner edge part of the transmission gear 73*a* toward the side of the bottom surface S2 (lower side in FIGS. 5 and 6) in the direction of the center axis C1.

The fourth extending portion 73*c* extends from one end of the third extending portion 73*b* on the side of the bottom surface S2 in the direction of the center axis C1 toward a radially outer side of the transmitting portion 73.

The fifth extending portion 73*d* extends from a radially outer edge part of the fourth extending portion 73*c* toward the side of the bottom surface S2 (lower side in FIGS. 5 and 6) in the direction of the center axis C1.

The sixth extending portion 73*e* extends from an intermediate part of the fifth extending portion 73*d* in the direction of the center axis C1 toward the radially outer side of the transmitting portion 73. The sixth extending portion 73*e* is formed with a fastening hole 73*f* penetrating through this sixth extending portion 73*e* in the direction of the center axis C1.

The engaging portion 74 includes a disc-like portion 74*a* and external teeth 74*b*, The disc-like portion 74*a* corresponds to a third part of the gear device according to the present invention. The disc-like portion 74*a* extends in a radial direction of the transmitting portion 71. The external teeth 74*b* are provided on an outer end part of the disc-like portion 74*a*. Further, a through hole 74*c* penetrating through the disc-like portion 74*a* in the direction of the center axis C1 is formed in an inner end part of the disc-like portion 74*a*.

Here, in the case of mounting the first input gear 91*a* as the input gear as shown in FIG. 5, the engaging portion 74 is positioned in such a position that the inner end part of the disc-like portion 74*a* is in contact with one end surface (lower surface in the direction of the center axis C1 in FIG. 5) of the sixth extending portion 73*e* in the direction of the center axis C1 and the through hole 74*c* in this engaging portion 74 communicates with the fastening hole 73*f* of the sixth extending portion 73*e*. Then, the third fastening member T3 is inserted into the fastening hole 73*f* of the sixth extending portion 73*e* through the through hole 74*c* of the disc-like portion 74*a* from the lower side in the direction of the center axis C1 and the transmitting portion 73 and the engaging portion 74 are fixed by this third fastening member T3. In this way, the linking member 7 is arranged in the first position where the first input gear 91*a* in the torque input unit 9 and the external teeth 74*b* of the engaging portion 74 are engaged.

On the other hand, in the case of mounting the second input gear 102*c* as the input gear as shown in FIG. 6, the engaging portion 74 is positioned in such a position that the inner end part of the disc-like portion 74*a* is in contact with the other end surface (upper surface in the direction of the center axis C1 in FIG. 6) of the sixth extending portion 73*e* in the direction of the center axis C1 and the through hole 74*c* in this engaging portion 74 communicates with the fastening hole 73*f* of the sixth extending portion 73*e*. Then, the third fastening member T3 is inserted into the fastening hole 73*f* of the sixth extending portion 73*e* through the through hole 74*c* of the disc-like portion 74*a* from the upper side in the direction of the center axis C1 and the transmitting portion 73 and the engaging portion 74 are fixed by this third fastening member T3. In this way, the linking member 7 is arranged in the second position where the second input gear 102*c* in the torque input unit 100 and the external teeth 74*b* of the engaging portion 74 are engaged.

As just described, in the first modification shown in FIGS. 5 and 6, the linking member 7 is configured to selectively take the first and second positions by changing the fixed position of the disc-like portion 74*a* of the engaging portion 72 to the sixth extending portion 73*e* of the transmitting portion 71.

Note that although the engaging portion 74 shown in FIG. 5 and the engaging portion 74 shown in FIG. 6 are arranged in postures oriented opposite to each other along the direction of the center axis C1, there is no limitation to this. The linking member 7 may be configured to selectively take the first and second positions only by changing the fixed position of the engaging portion 74 to the transmitting portion 71 without changing the posture of the engaging portion 74.

Note that although the crankshafts 6 are arranged in the circumferential direction of the carrier 2 in the embodiment and the first modification, there is no limitation to this. For example, the gear device X1 may be a center crank type gear device as in a second modification shown in FIGS. 7 and 8.

Figure 7:
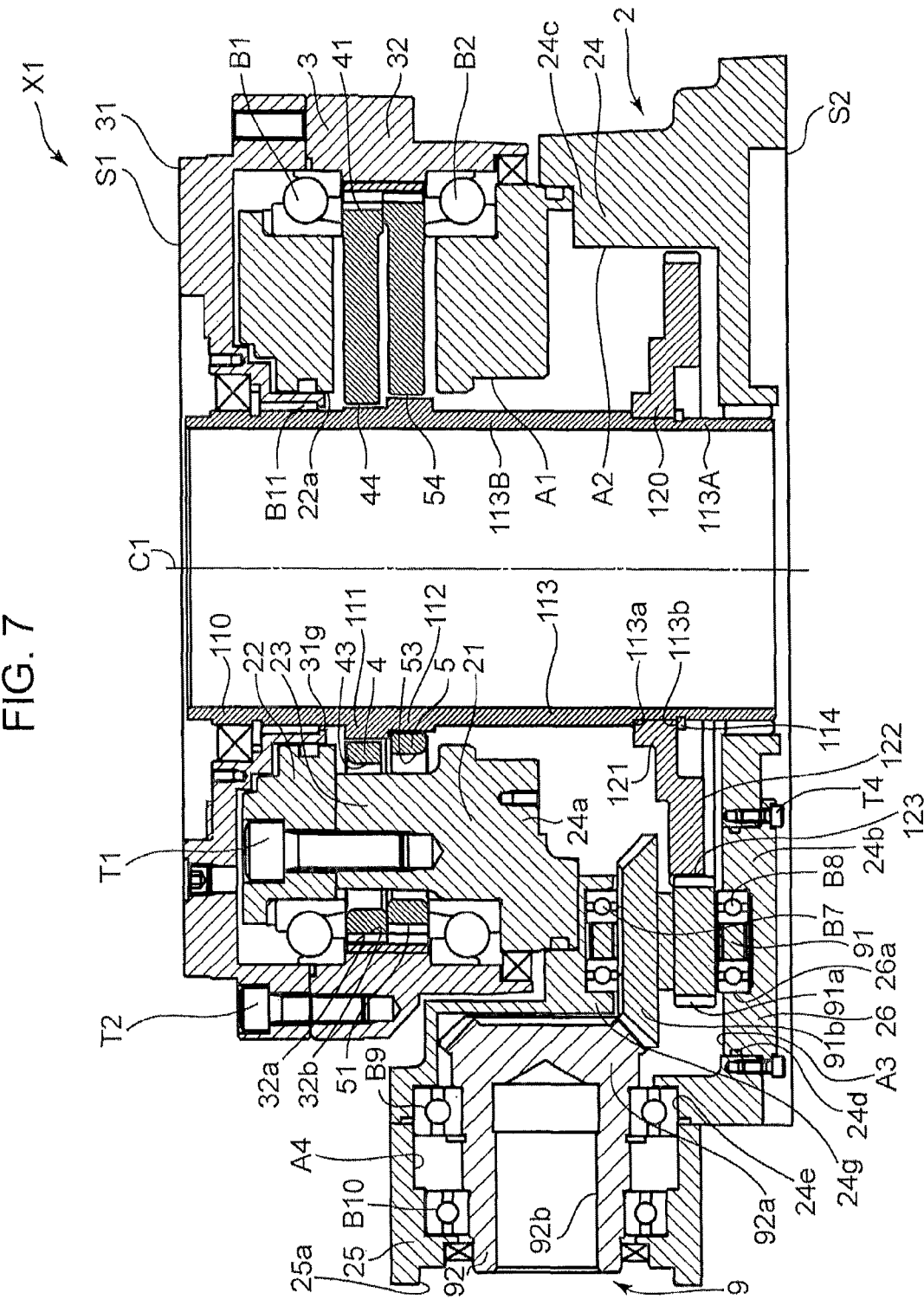
FIG. 7 is a sectional view showing a schematic configuration of a gear device according to a second modification in which the linking member is arranged in the first position.
Figure 8:
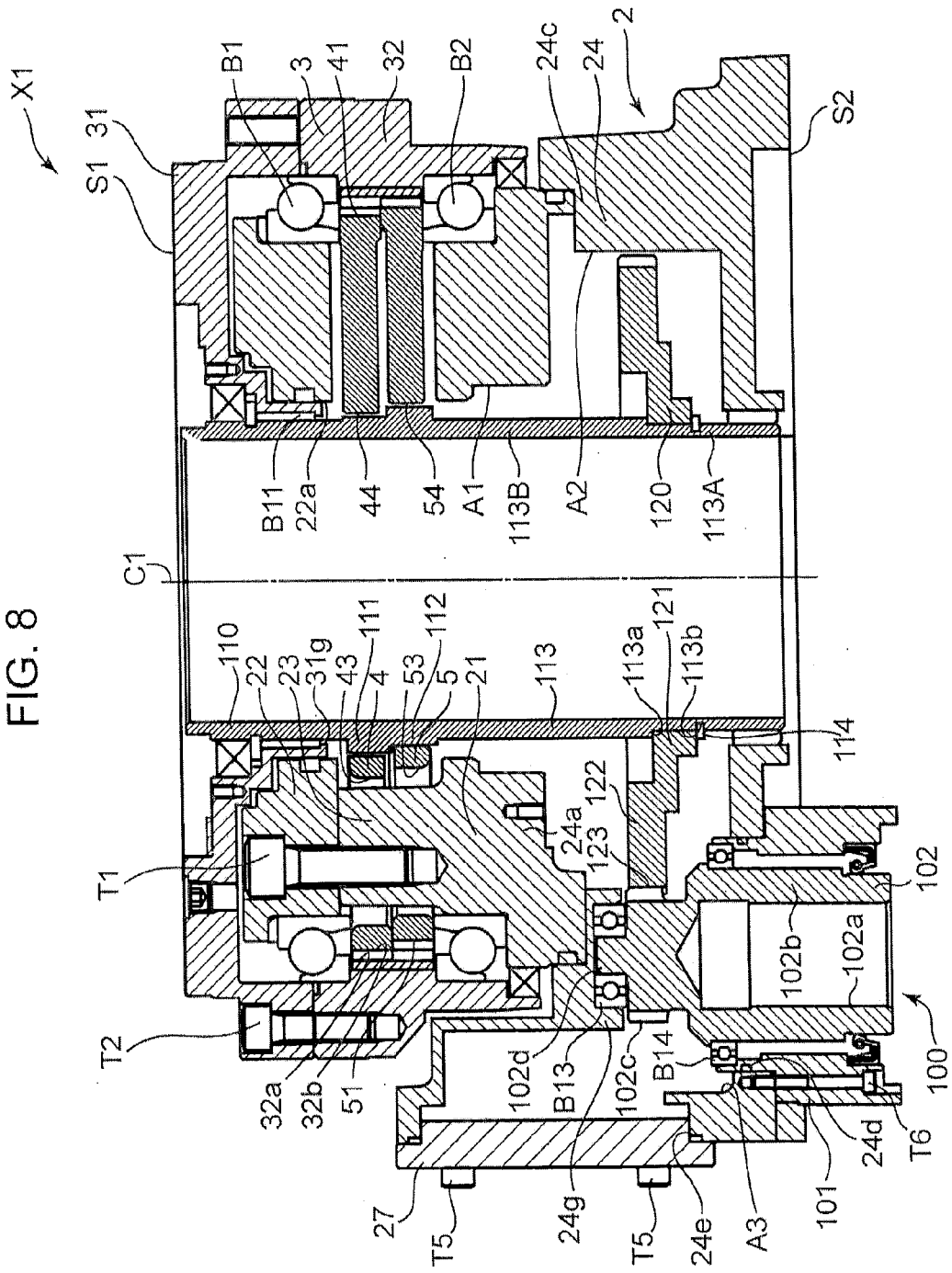
FIG. 8 is a sectional view showing a schematic configuration of the gear device according to the second modification in which the linking member is arranged in the second position.

In the second modification shown in FIGS. 7 and 8, the cylindrical body 8 and the crankshafts 6 are not provided and a center crankshaft 110 is provided in the central part of the gear device X1 where the cylindrical body 8 was arranged.

The center crankshaft 110 rotates about the center axis C1 as an axial center and rockingly rotates the oscillation gears 4, 5 via bearings (not shown) according to this rotation. The center crankshaft 110 is arranged to penetrate through the outer cylinder 3, the oscillation gears 4, 5 and the carrier 2 in the direction of the center axis C1 with the center axis C1 as the axial center. A pair of bearings B11, B12 separated from each other in the direction of the center axis C1 are provided among the center crankshaft 110, the one lateral portion 31 of the outer cylinder 3 and the other portion 24b of the carrier 2. The bearings B11, B12 allow the center crankshaft 110 to rotate about the center axis C1 as the axial center.

The center crankshaft 110 includes eccentric portions 111, 112 and a shaft main body 113.

The eccentric portions 111, 112 are integrally formed to the shaft main body 113 while being eccentric with respect to the center axis C1 as an axial center of the shaft main body 113. The first eccentric portion 111 is located in the insertion hole 44 of the oscillation gear 4 and the second eccentric portion 112 is located in the insertion hole 54 of the oscillation gear 5.

The shaft main body 113 is a part of the center crankshaft 110 except the eccentric portions 111, 112. The shaft main body 113 includes a small-diameter portion 113A and a large-diameter portion 113B. In the second modification, a spline is formed on the outer peripheral surface of the small-diameter portion 113A.

The small-diameter portion 113A is an end part of the shaft main body 113 on the side of the bottom surface S2 in the direction of the center axis C1.

The large-diameter portion 113B has an outer diameter slightly larger than that of the small-diameter portion 113A. The large-diameter portion 113B is located between the small-diameter portion 113A and the eccentric portions 111, 112 in the center axis direction.

In the second modification shown in FIGS. 7 and 8, a linking member 120 is provided instead of the linking member 7.

The linking member 120 has a hollow shape and is so arranged that the small-diameter portion 113A of the shaft main body 113 penetrates through this hollow part. In the second modification, a spline is formed on the inner peripheral surface of the linking member 120. The spline formed on the inner peripheral surface of the linking member 120 and that formed on the outer peripheral surface of the small-diameter portion 113A are engaged with each other, whereby the linking member 120 and the center crankshaft 110 integrally rotate.

The linking member 120 includes a tubular portion 121, a disc-like portion 122 and external teeth 123.

The tubular portion 121 is a part of the linking member 120 extending in the direction of the center axis C1. The tubular portion 121 circumferentially surrounds the small-diameter portion 113A.

The disc-like portion 122 extends from one end of the tubular portion 121 in the direction of the center axis C1 toward a radially outer side of the linking member 120.

The external teeth 123 are provided on an outer end of the disc-like portion 122.

Here, in the case of mounting the first input gear 91a as the input gear as shown in FIG. 7, the linking member 120 is inserted into the small-diameter portion 113A of the shaft main body 113 in such a posture that the other end of the tubular portion 121 in the direction of the center axis C1 is located closer to the upper surface S1 than the one end of the tubular portion 121. Then, the insertion of the linking member 120 is stopped at a position where the other end of the tubular portion 121 comes into contact with an end surface 113a of the large-diameter portion 113B in the direction of the center axis C1, and a stop ring 114 is mounted into a recess 113b formed on the small-diameter portion 113A at this stop position, whereby the tubular portion 121 is fixed between the end surface 113a and the stop ring 114. In this way, the linking member 120 is arranged in the first position where the first input gear 91a in the torque input unit 9 and the external teeth 123 are engaged.

On the other hand, in the case of mounting the second input gear 102c as the input gear as shown in FIG. 8, the linking member 120 is inserted into the small-diameter portion 113A of the shaft main body 113 in a posture oriented opposite to that shown in FIG. 7 in the direction of the center axis C1. Then, the insertion of the linking member 120 is stopped at a position where the one end of the tubular portion 121 comes into contact with the end surface 113a of the large-diameter portion 113B in the direction of the center axis C1, and the stop ring 114 is mounted into the recess 113b formed on the small-diameter portion 113A at this stop position, whereby the tubular portion 121 is fixed between the end surface 113a and the stop ring 114. In this way, the linking member 120 is arranged in the second position where the second input gear 102c in the torque input unit 100 and the external teeth 123 are engaged.

As just described, in the second modification shown in FIGS. 7 and 8, the linking member 120 can selectively take the first and second positions by changing the fixed posture of the linking member 120 to the center crankshaft 110 in the center crank type gear device X1.

Further, in the second modification shown in FIGS. 7 and 8, the linking member 120 is positioned by mounting the single stop ring 114 into the recess 113b regardless of whether the linking member 120 is arranged in the first position or in the second position. Specifically, the gear device X1 shown in FIG. 7 and the gear device X1 shown in FIG. 8 are composed of the same constituent members. Thus, an increase in the number of components can be suppressed.

Note that although the linking member 120 is composed of a single member in the second modification, there is no limitation to this. For example, a linking member 130 may include a transmitting portion 131 and an engaging portion 132 are formed to separate from this transmitting portion 131 as in a third modification shown in FIGS. 9 and 10.

Figure 9:
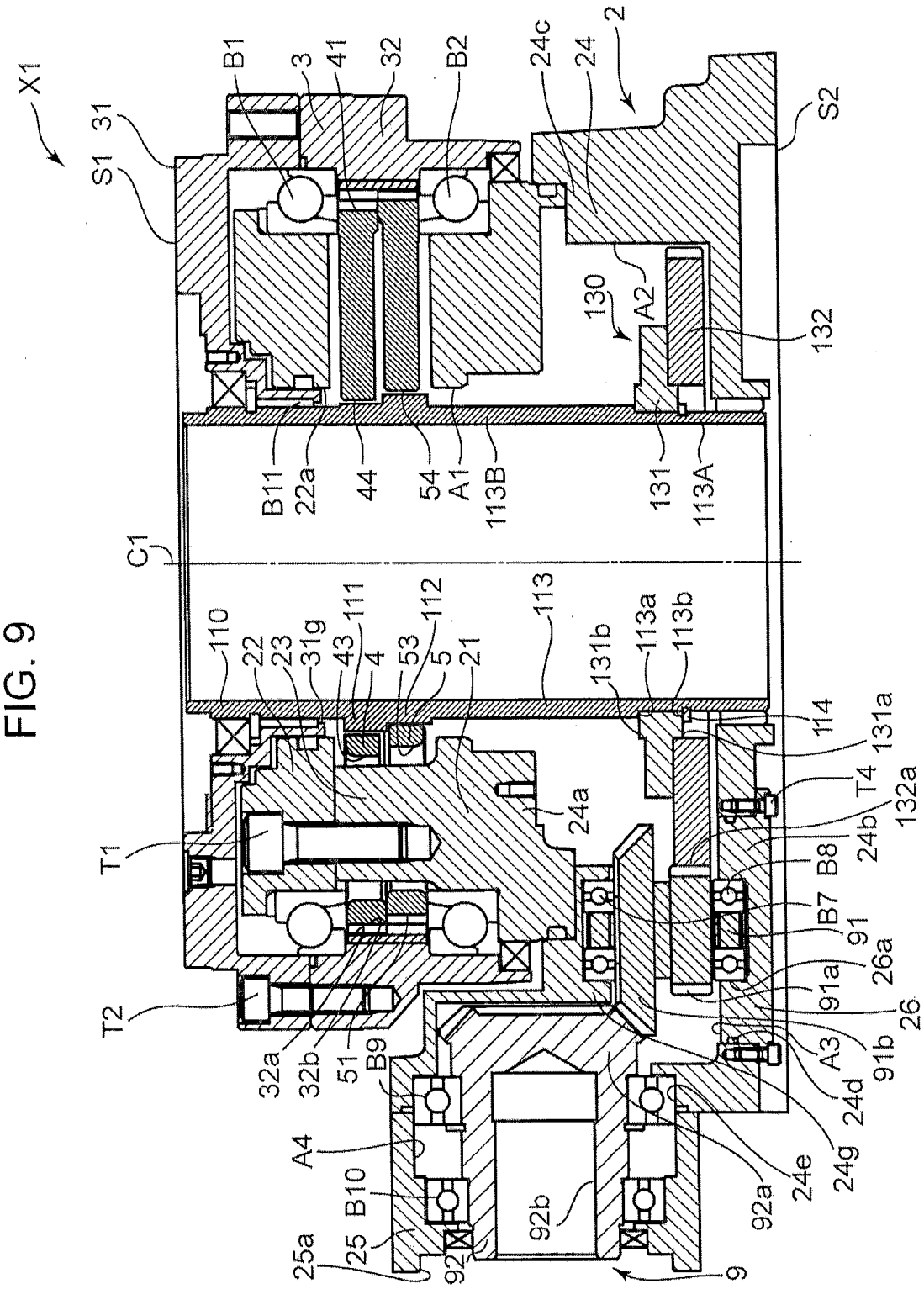
FIG. 9 is a sectional view showing a schematic configuration of a gear device according to a third modification in which the linking member is arranged in the first position.
Figure 10:
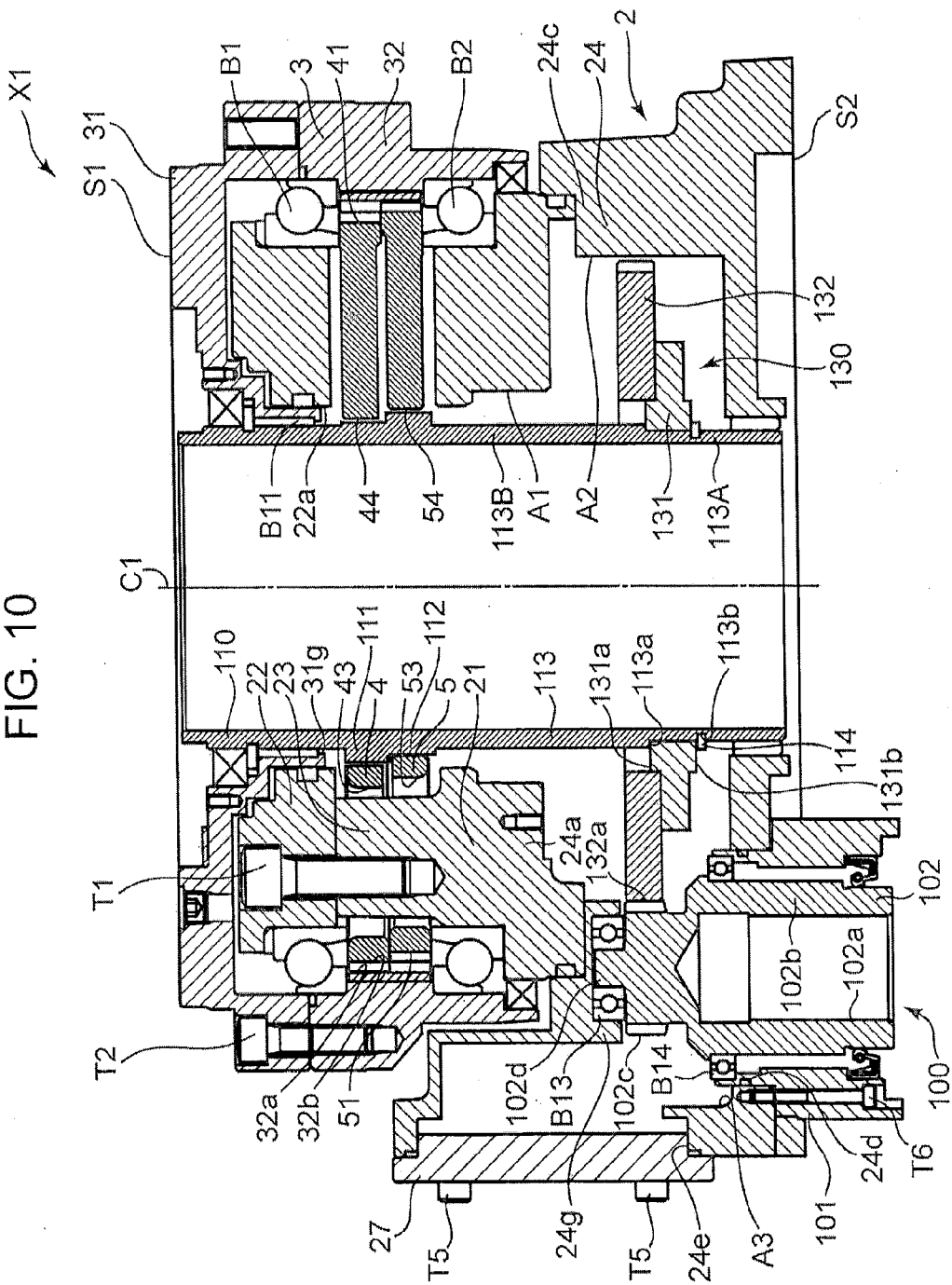
FIG. 10 is a sectional view showing a schematic configuration of the gear device according to the third modification in which the linking member is arranged in the second position.

In the third modification shown in FIGS. 9 and 10, the linking member 130 is provided instead of the linking member 120 of the second modification. The linking member 130 includes the transmitting portion 131 and the engaging portion 132.

The transmitting portion 131 has a hollow shape and the small-diameter portion 113A is inserted in this hollow part. The transmitting portion 131 is fixed between the end surface 113a and the stop ring 114 in the direction of the center axis C1 at a position where this transmitting portion 131 is in contact with the end surface 113a of the large-diameter portion 113B.

The engaging portion 132 has a hollow shape. An inner diameter of the engaging portion 132 is set larger than an outer diameter of the shaft main body 113 and slightly smaller than an outer diameter of the transmitting portion 131. The engaging portion 132 includes external teeth 132a provided on an outer edge part of this engaging portion 132.

Here, in the case of mounting the first input gear 91a as the input gear as shown in FIG. 9, the engaging portion 132 is fixed to the transmitting portion 131 by being fitted into a first fitting portion 131a formed on a part of the transmitting portion 131 on the side of the bottom surface S2 in the direction of the center axis C1. In this way, the linking member 130 is arranged in the first position where the first input gear 91a in the torque input unit 9 and the external teeth 132a of the engaging portion 132 are engaged.

On the other hand, in the case of mounting the second input gear 102c as the input gear as shown in FIG. 10, the engaging portion 132 is fixed to the transmitting portion 131 by being fitted into a second fitting portion 131b formed on a part of the transmitting portion 131 on the side of the upper surface S1 in the direction of the center axis C1. In this way, the linking member 130 is arranged in the second position where the second input gear 102c in the torque input unit 100 and the external teeth 132a of the engaging portion 132 are engaged.

In the third modification shown in FIGS. 9 and 10, the transmitting portion 131 is positioned and the linking member 130 is fixed to the fitting portion 131a, 131b of this transmitting portion 131 by mounting the single stop ring 114 into the recess 113b, regardless of whether the linking member 130 is arranged in the first position or in the second position. Specifically, the gear device X1 shown in FIG. 9 and the gear device X1 shown in FIG. 10 are composed of the same constituent members. Thus, an increase in the number of components can be suppressed.

Note that although the linking member 130 is configured to take the first and second positions by making the fixed position of the engaging portion 132 to the transmitting portion 131 changeable in the third modification, there is no limitation to this. For example, a linking member 140 may be composed of a single member and the fixed position thereof to the center crankshaft 110 may be made changeable as in a fourth modification shown in FIGS. 11 and 12.

Figure 11:
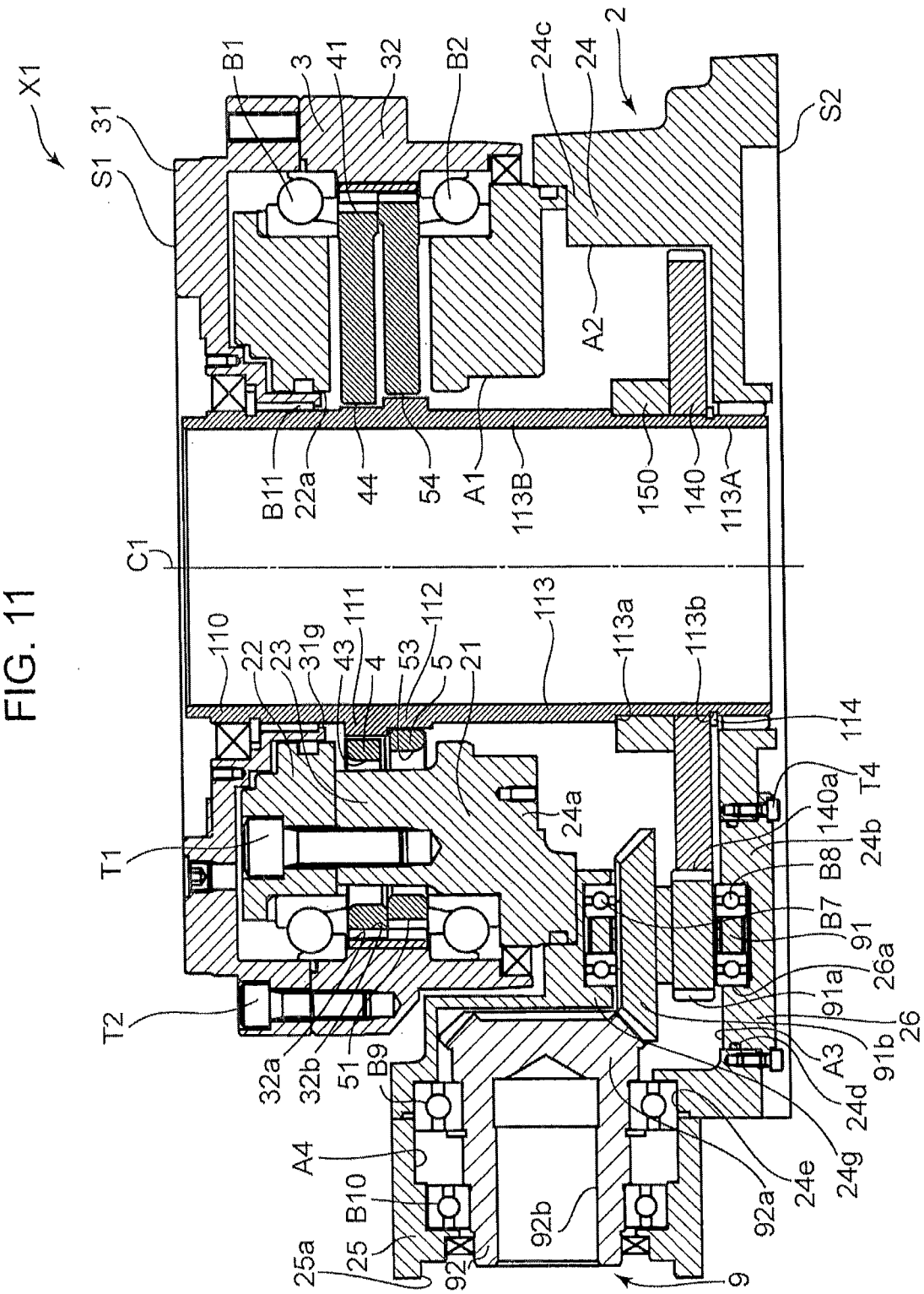
FIG. 11 is a sectional view showing a schematic configuration of a gear device according to a fourth modification in which the linking member is arranged in the first position.
Figure 12:
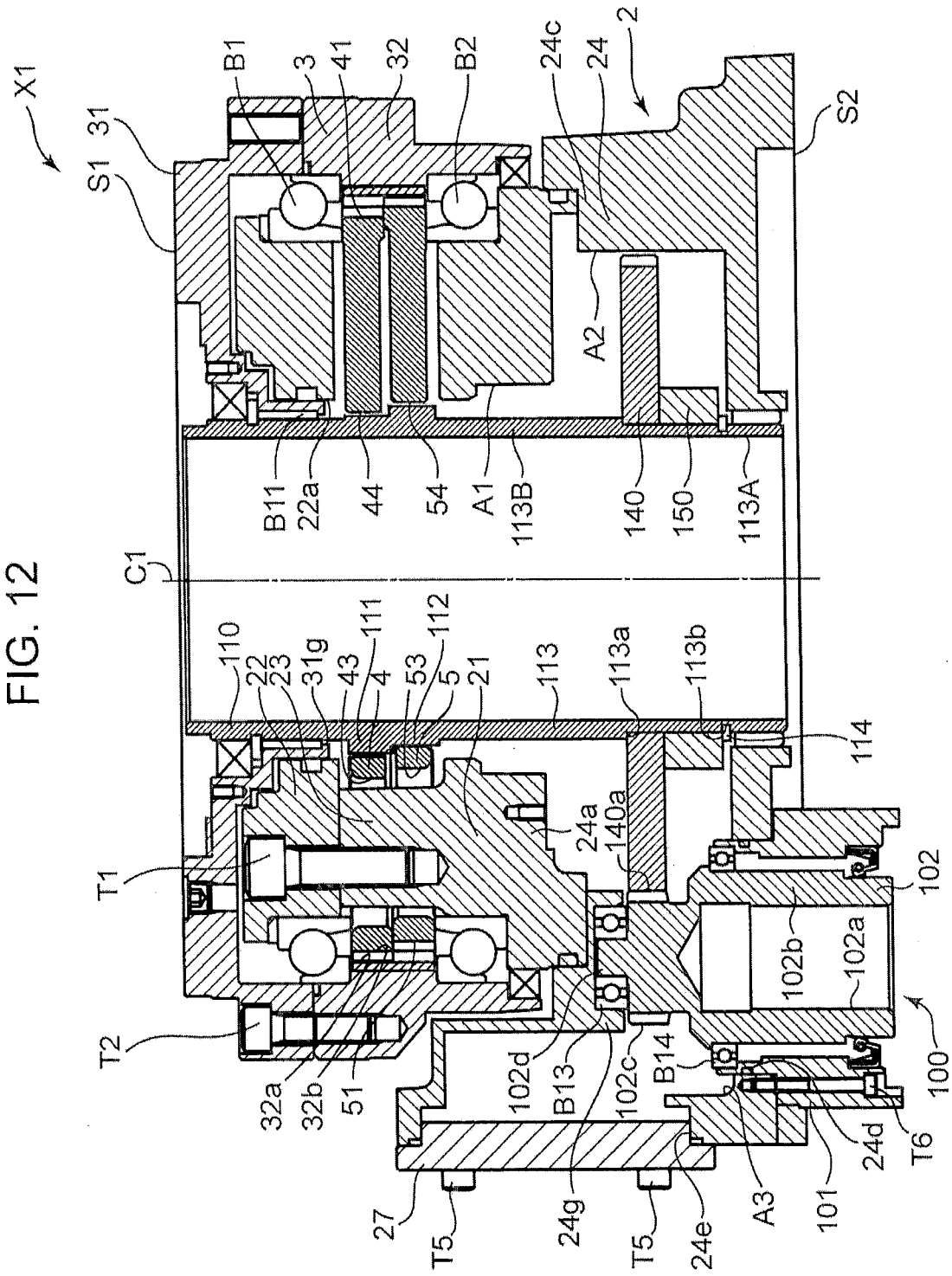
FIG. 12 is a sectional view showing a schematic configuration of the gear device according to the fourth modification in which the linking member is arranged in the second position.

In the fourth modification shown in FIGS. 11 and 12, an aligning member 150 is further provided and a linking member 140 is provided instead of the linking member 130 in the third modification.

The aligning member 150 has a hollow shape and the small-diameter portion 113A is inserted in this hollow part. An inner diameter of the aligning member 150 is set slightly larger than an outer diameter of the small-diameter portion 113A and smaller than an outer diameter of the large-diameter portion 113B.

The linking member 140 has a hollow shape and the small-diameter portion 113A is inserted in this hollow part. In the fourth modification, a spline is formed on the inner peripheral surface of the linking member 140. The spline formed on the inner peripheral surface of the linking member 140 and that formed on the outer peripheral surface of the small-diameter portion 113A are engaged with each other, whereby the linking member 140 and the center crankshaft 110 integrally rotate. Further, the linking member 140 includes external teeth 140a provided on an outer edge part of this linking member 140.

Here, in the case of mounting the first input gear 91a as the input gear as shown in FIG. 11, the small-diameter portion 113A is inserted into the hollow part of the aligning member 150 and the aligning member 150 comes into contact with the end surface 113a of the large-diameter portion 113B in the direction of the center axis C1. Thereafter, the small-diameter portion 113A is inserted into the hollow part of the linking member 140 and the stop ring 114 is mounted into the recess 113b at a position where the linking member 140 comes into contact with an end surface of the aligning member 150 in the direction of the center axis C1. In this way, the aligning member 150 and the linking member 140 are fixed between the end surface 113a and the stop ring 114 and the linking member 140 is arranged in the first position where the first input gear 91a in the torque input unit 9 and the external teeth 140a are engaged.

On the other hand, in the case of mounting the second input gear 102c as the input gear as shown in FIG. 12, the small-diameter portion 113A is inserted into the hollow part of the linking member 140 and the linking member 140 comes into contact with the end surface 113a of the large-diameter portion 113B in the direction of the center axis C1. Thereafter, the small-diameter portion 113A is inserted into the hollow part of the aligning member 150 and the stop ring 114 is mounted into the recess 113b at a position where the aligning member 150 comes into contact with an end surface of the linking member 140 in the direction of the center axis C1. In this way, the linking member 140 and the aligning member 150 are fixed between the end surface 113a and the stop ring 114 and the linking member 140 is arranged in the second position where the second input gear 102c in the torque input unit 100 and the external teeth 140a are engaged.

As just described, in the fourth modification, the linking member 140 is configured to take the first and second positions by switching the arrangement of the linking member 140 and the aligning member 150 and changing the fixed position of the linking member 140 to the small-diameter portion 113A of the small-diameter portion 113.

Further, in the fourth modification shown in FIGS. 11 and 12, the linking member 140 and the aligning member 150 are positioned by mounting the single stop ring 114 into the recess 113b, regardless of whether the linking member 140 is arranged in the first position or in the second position. Specifically, the gear device X1 shown in FIG. 11 and the gear device X1 shown in FIG. 12 are composed of the same constituent members. Thus, an increase in the number of components can be suppressed.

Note that although the fixed position of the linking member 140 to the center crankshaft 110 is adjusted by the aligning member 150 in the fourth modification, there is no limitation to this. For example, the fixed position of the linking member 140 to the center crankshaft 110 may be made changeable by forming a plurality of recesses 113c, 113d on the small-diameter portion 113A as in a fifth modification shown in FIGS. 13 and 14.

Figure 13:
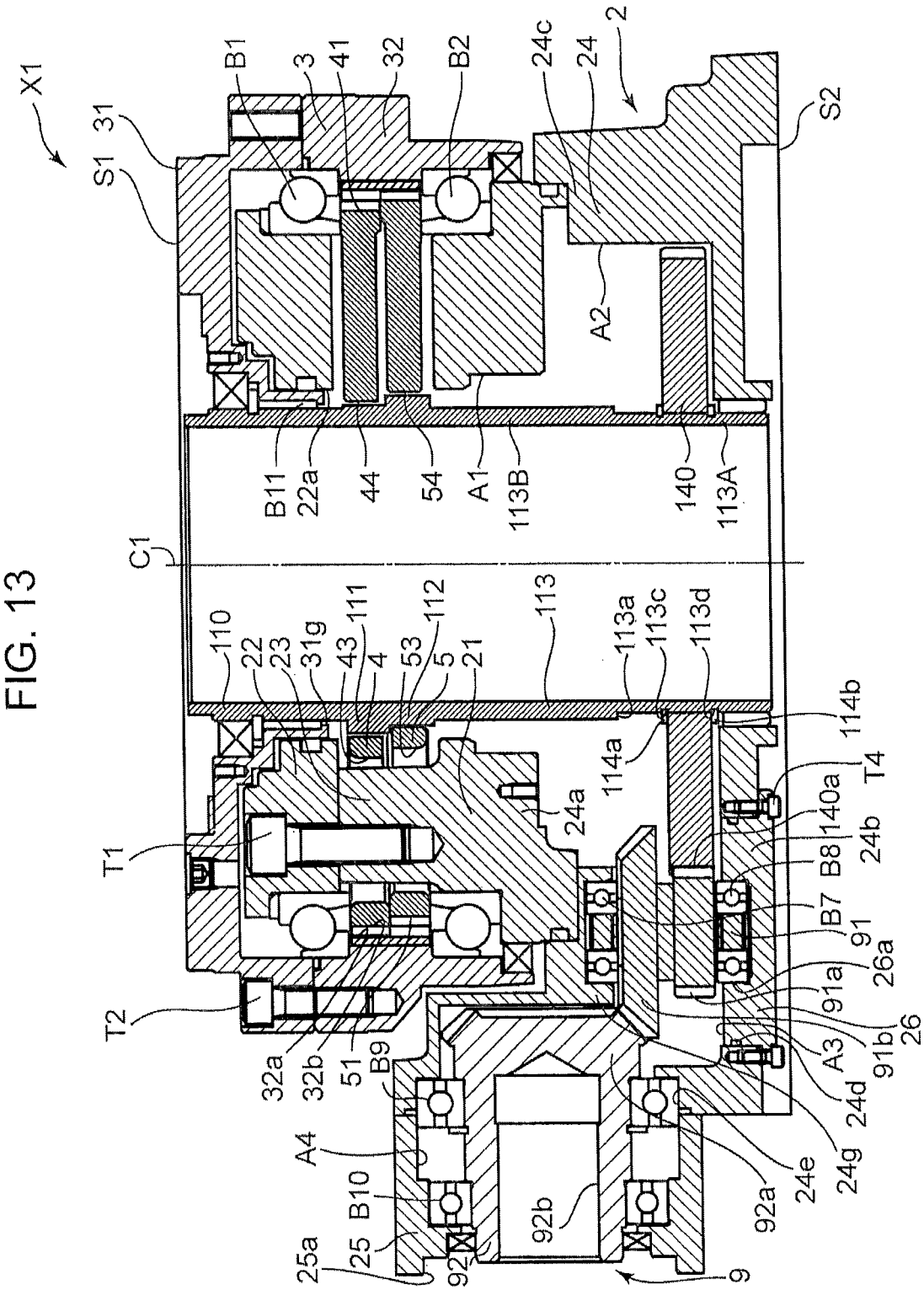
FIG. 13 is a sectional view showing a schematic configuration of a gear device according to a fifth modification in which the linking member is arranged in the first position.
Figure 14:
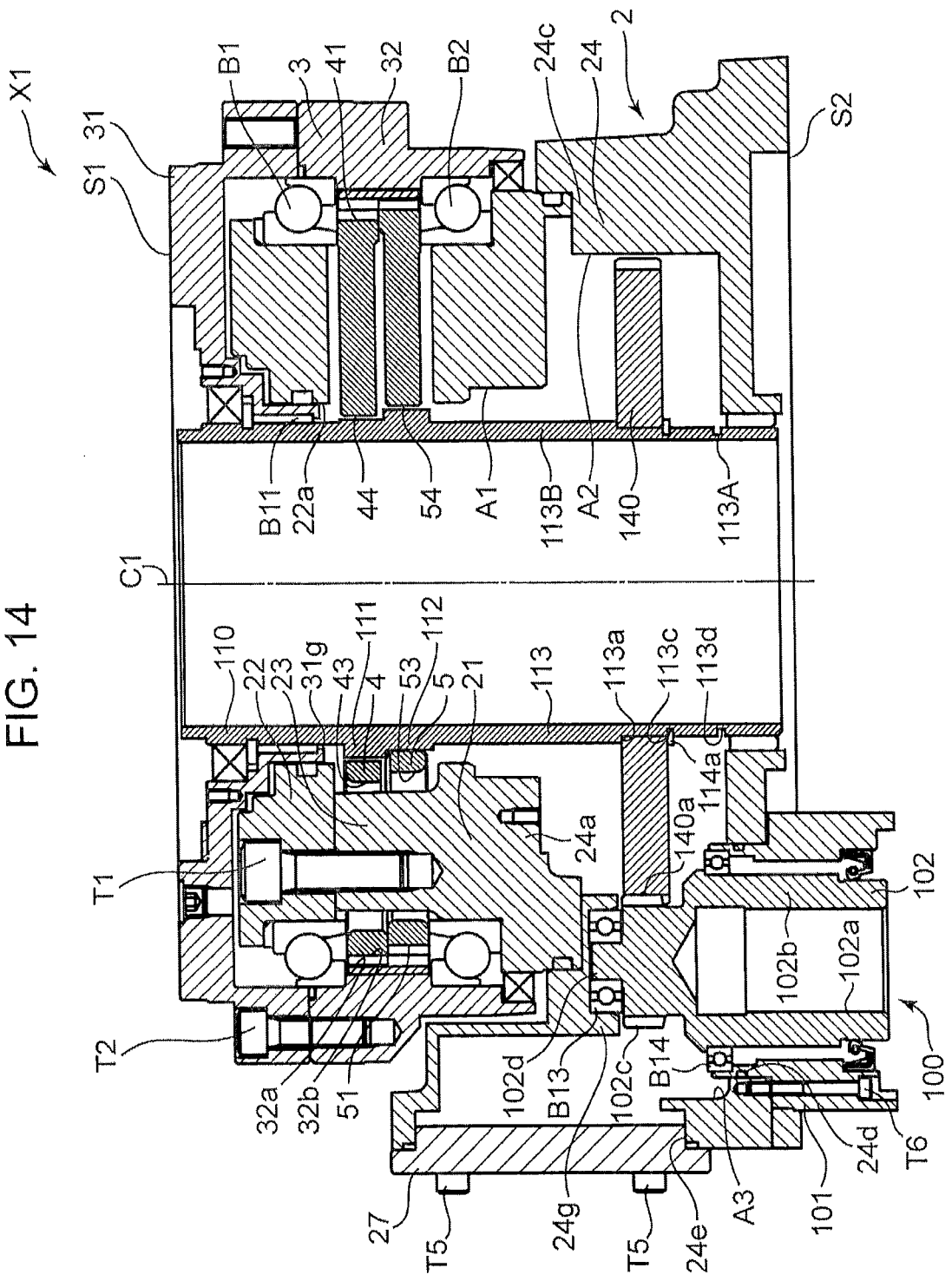
FIG. 14 is a sectional view showing a schematic configuration of the gear device according to the fifth modification in which the linking member is arranged in the second position.

In the fifth modification shown in FIGS. 13 and 14, the small-diameter portion 113A is formed with a first recess 113c and a second recess 113d juxtaposed in the direction of the center axis C1. The first recess 113c is located closer to the end surface 113a of the large-diameter portion 113B in the direction of the center axis C1 than the second recess 113d.

Here, in the case of mounting the first input gear 91a as the input gear as shown in FIG. 13, the small-diameter portion 113A is inserted into the hollow part of the linking member 140 with a first stop ring 114a mounted in the first recess 113c. Then, the insertion of the small-diameter portion 113A is stopped at a position where the linking member 140 comes into contact with the first stop ring 114a in the direction of the center axis C1, and a second stop ring 114b is mounted into the second recess 113d at this stop position. In this way, the linking member 140 is fixed between the first stop ring 114a and the second stop ring 114b in the direction of the center axis C1 and arranged in the first position where the first input gear 91a in the torque input unit 9 and the external teeth 140a are engaged.

On the other hand, in the case of mounting the second input gear 102c as the input gear as shown in FIG. 14, the small-diameter portion 113A is inserted into the hollow part of the linking member 140 and the linking member 140 comes into contact with the end surface 113a of the large-diameter portion 113B in the direction of the center axis C1. Then, the linking member 140 is fixed between the end surface 113a and the first stop ring 114a in the direction of the center axis C1 by mounting the first stop ring 114a into the first recess 113c. In this way, the linking member 140 is arranged in the second position where the second input gear 102c in the torque input unit 100 and the external teeth 140a are engaged.

In the fifth modification shown in FIGS. 13 and 14, the linking member 140 is positioned in the first position by the first and second stop rings 114a, 114b and positioned in the second position by the first stop ring 114a and the end surface 113a of the large-diameter portion 113B. Specifically, the gear device X1 shown in FIG. 13 and the gear device X1 shown in FIG. 14 differ only in the number of the stop rings mounted on the small-diameter portion 113A and the other constituent members are the same. Thus, an increase in the number of components can be suppressed.

Note that although the linking member 140 comes into contact with the end surface 113a of the large-diameter portion 13B when being arranged in the first position in the fifth modification, there is no limitation to this. For example, the shaft main body 113 may not include the large-diameter portion 113B as in a sixth modification shown in FIGS. 15 and 16.

Figure 15:
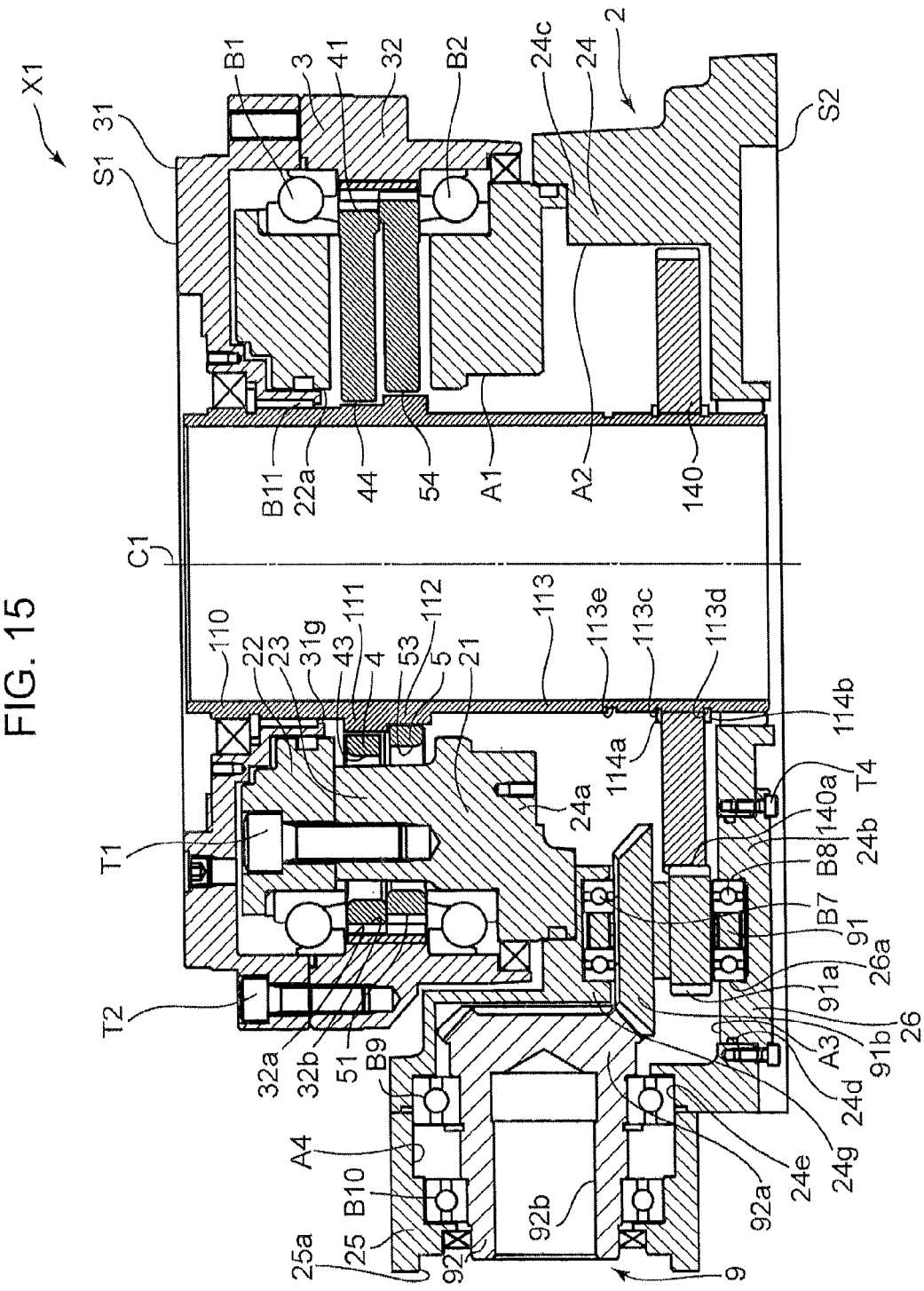
FIG. 15 is a sectional view showing a schematic configuration of a gear device according to a sixth modification in which the linking member is arranged in the first position.

In the sixth modification shown in FIGS. 15 and 16, the large-diameter portion 113B is not present and the entire shaft main body 113 has the same outer diameter. The shaft main body 113 is formed with a third recess 113e in addition to the first and second recesses 113c, 113d in the fifth modification. The third recess 113e is juxtaposed with the recesses 113c, 113d in the direction of the center axis C1 and located closer to the upper surface S1 than these recesses 113c, 113d.

Here, in the case of mounting the first input gear 91a as the input gear as shown in FIG. 15, the linking member 140 is fixed between the first stop ring 114a mounted in the first recess 113c and the second stop ring 114b mounted in the second recess 113d as in the fifth modification shown in FIG. 13. In this way, the linking member 140 is arranged in the first position where the first input gear 91a in the torque input unit 9 and the external teeth 140a are engaged.

On the other hand, in the case of mounting the second input gear 102c as the input gear as shown in FIG. 16, the small-diameter portion 113A is inserted into the hollow part of the linking member 140 with a third stop ring 114c mounted in the third recess 113e. Then, the insertion of the small-diameter portion 113A is stopped at a position where the linking member 140 comes into contact with the third stop ring 114c in the direction of the center axis C1, and the first stop ring 114a is mounted into the first recess 113c at this stop position. In this way, the linking member 140 is fixed between the third and first stop rings 114c, 114a in the direction of the center axis C1 and arranged in the second position where the second input gear 102c in the torque input unit 100 and the external teeth 140a are engaged.

In the sixth modification shown in FIGS. 15 and 16, the linking member 140 is positioned in the first position by the first and second stop rings 114a, 114b and positioned in the second position by the first and third stop ring 114a, 114c. Specifically, in both the gear device X1 shown in FIG. 15 and the gear device X1 shown in FIG. 16, the linking member 140 is positioned in a desired position by two stop rings. Thus, the gear device X1 shown in FIG. 15 and the gear device X1 shown in FIG. 16 are composed of the same constituent members, whereby an increase in the number of components can be suppressed.

The embodiment and the modifications described above should be considered to be illustrative in all aspects and not to be restrictive. The scope of the present invention is indicated not by the description of the above embodiment and modifications, but by the scope of claims and includes all changes within the meaning and range of equivalents to the scope of claims.

Note that the aforementioned specific embodiment includes inventions having the following configurations.

The present invention concerns a gear device in which either one of a first input gear and a second input gear is selectively mounted as an input gear and which is provided with a crankshaft including a shaft main body and an eccentric portion eccentric with respect to an axial center of the shaft main body; a linking member including external teeth and configured to transmit the rotation of the input gear to the crankshaft; a carrier configured to rotatably support the crankshaft; an oscillation gear oscillating and rotating due to rotation of the eccentric portion; and an outer cylinder including internal teeth engaged with the oscillation gear, wherein: the carrier and the outer cylinder are coaxially and relatively rotate due to oscillation and rotation of the oscillation gear; and the linking member is disposed in either one of a first position where the external teeth are engaged with the first input gear mounted in the gear device and a second position where the external teeth are engaged with the second input gear mounted in the gear device.

In the above gear device, the linking member is disposed in either the first position where the external teeth are engaged with the first input gear or the second position where the external teeth are engaged with the second input gear. Thus, an input torque from the input gear can be transmitted to the crankshaft regardless of whether the input gear is the first input gear or the second input gear by switching the position of the linking member to either one of the first and second positions according to the input gear mounted in the gear device. As just described, in the above gear device, the arrangement of the input gear can be changed while an increase in the number of components is suppressed since the linking member can selectively take the position corresponding to either one of the first and second input gears.

The linking member preferably includes an engaging portion having a first part extending in an axial direction of the oscillation gear and a second part extending from one end of the first part in a radial direction of the oscillation gear and having the external teeth provided at an outer end of the second part. In this case, the engaging portion is preferably configured to selectively assume a first posture where the linking member is in the first position and a second posture which is oriented opposite to the first posture in the axial direction and where the linking member is in the second position.

In the above gear device, the linking member includes the engaging portion having the first part extending in the axial direction of the oscillation gear and the second part extending from the one end of this first part in the radial direction of the oscillation gear, and this engaging portion is configured to selectively assume the first and second postures. Here, the first and second postures are postures oriented opposite to each other in the axial direction. Specifically, in the above gear device, the position of the linking member can be easily changed to either one of the first and second positions only by inverting the posture of the engaging portion in the axial direction according to the input gear mounted in the gear device.

The linking member preferably further includes a transmitting portion which is formed of a member which is formed of a member separate from the engaging portion and configured to transmit the rotation of the input gear to the crankshaft via the engaging portion. In this case, the transmitting portion preferably includes a positioning portion configured to position the engaging portion such that the engaging portion is fixed to the transmitting portion at the same fixed position regardless of whether the engaging portion assumes the first posture or the second posture.

In the above gear device, the engaging portion is fixed to the transmitting portion while being positioned in the first posture by the positioning portion when the first input gear is mounted in the gear device. In the case of changing the input gear mounted in the gear device from the first input gear to the second input gear, the engaging portion is removed from the transmitting portion and the posture of the engaging portion is inverted from the first posture to the second posture. Then, the engaging portion is positioned in the second posture by the positioning portion. In this way, the engaging portion in the second posture is fixed to the transmitting portion at the same fixed position as the engaging portion in the first posture. As just described, the engaging portion is fixed to the transmitting portion at the same fixed position regardless of whether the engaging portion assumes the first posture or the second posture. Thus, the position of the linking member can be easily changed from either one of the first and second positions to the other.

The first part preferably has a tubular shape. In this case, the above gear device preferably further includes a bearing fitted into the first part to be held in contact with an inner peripheral surface of the first part and configured to rotatably support the linking member.

In the above gear device, the linking member can be rotatably supported on the bearing by fitting the bearing into the inside of the tubular first part.

The positioning portion preferably positions the engaging portion such that the inner peripheral surface of the first part is held in contact with the positioning portion.

In the above gear device, the inner peripheral surface of the first part can be accurately positioned since the engaging portion is so positioned that the inner peripheral surface of the first part is held in contact with the positioning portion. In this way, relative positions of the inner peripheral surface of the first part and the bearing held in contact with the inner peripheral surface can be accurately positioned.

The linking member preferably includes an engaging portion having a third part extending in the radial direction of the oscillation gear and having the external teeth provided on an outer end of the third part and a transmitting portion separate from the engaging portion, fixed to the third part and configured to transmit the rotation of the input gear to the crankshaft via the engaging portion. In this case, the linking member is disposed in either one of the first position and the second position by changing the fixed position or fixed posture of the linking member to the shaft main body.

In the above gear device, the fixed position of the third part to the transmitting portion is changeable such that the linking member can selectively take the first and second positions. Specifically, in the above gear device, the position of the linking member can be switched to either one of the first and second positions by appropriately changing the fixed position of the engaging portion to the transmitting portion even without changing the posture of the engaging portion.

The linking member is preferably fixed to the shaft main body. In this case, the linking member is preferably configured to selectively take the first and second positions by changing the fixed position or fixed posture of the linking member to the shaft main body.

In the above gear device, the position of the linking member can be switched to either one of the first and second positions by appropriately changing the fixed position or fixed posture of the linking member to the shaft main body in a mode where the linking member is fixed to the shaft main body of the crankshaft.

This application is based on Japanese Patent application No. 2014-129322 filed in Japan Patent Office on Jun. 24, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gear device in which either one of a first input gear and a second input gear is selectively mounted as an input gear, comprising:
   a crankshaft including a shaft main body and an eccentric portion eccentric with respect to an axial center of the shaft main body;
   a linking member including external teeth and configured to transmit the rotation of the input gear to the crankshaft;
   a carrier configured to rotatably support the crankshaft;
   an oscillation gear oscillating and rotating due to rotation of the eccentric portion; and
   an outer cylinder including internal teeth engaged with the oscillation gear, wherein:
   the carrier and the outer cylinder are coaxially and relatively rotate due to oscillation and rotation of the oscillation gear; and
   the linking member is disposed in either one of a first position where the external teeth are engaged with the first input gear mounted in the gear device and a second position where the external teeth are engaged with the second input gear mounted in the gear device,
   wherein the linking member includes an engaging portion having a first part extending in an axial direction of the oscillation gear and a second part extending from one end of the first part in a radial direction of the first part and having the external teeth provided at an outer end of the second part; and
   wherein the engaging portion is configured to selectively assume a first posture where the linking member is in the first position and a second posture which is oriented opposite to the first posture in the axial direction and where the linking member is in the second position.

2. A gear device according to claim 1, wherein:
   the linking member further includes a transmitting portion which is formed of a member separated from the engaging portion and configured to transmit the rotation of the input gear to the crankshaft via the engaging portion; and
   the transmitting portion includes a positioning portion configured to position the engaging portion such that the engaging portion is fixed to the transmitting portion at the same fixed position regardless of whether the engaging portion assumes the first posture or the second posture.

3. A gear device according to claim 2, wherein:
the first part has a tubular shape; and
the gear device further comprises a bearing fitted into the first part to be held in contact with an inner peripheral surface of the first part and configured to rotatably support the linking member.

4. A gear device according to claim 3, wherein the positioning portion positions the engaging portion such that the inner peripheral surface of the first part is held in contact with the positioning portion.

5. A gear device in which either one of a first input gear and a second input gear is selectively mounted as an input gear, comprising:
a crankshaft including a shaft main body and an eccentric portion eccentric with respect to an axial center of the shaft main body;
a linking member including external teeth and configured to transmit rotation of the input gear to the crankshaft;
a carrier configured to rotatably support the crankshaft;
an oscillation gear oscillating and rotating due to rotation of the eccentric portion; and
an outer cylinder including internal teeth engaged with the oscillation gear,
wherein the carrier and the outer cylinder are coaxially and relatively rotate due to oscillation and rotation of the oscillation gear;
wherein the linking member is disposed in either one of a first position where the external teeth are engaged with the first input gear mounted in the gear device and a second position where the external teeth are engaged with the second input gear mounted in the gear device;
wherein the linking member includes an engaging portion having a part extending in a radial direction of the oscillation gear and having the external teeth provided on an outer end of the part and a transmitting portion which is formed of a member separated from the engaging portion, fixed to the part and configured to transmit the rotation of the input gear to the crankshaft via the engaging portion; and
wherein the linking member is configured to selectively take the first and second positions by changing the fixed position of the part to the transmitting portion in an extension direction of a central axis of relative rotation between the carrier and the outer cylinder.

6. A gear device in which either one of a first input gear and a second input gear is selectively mounted as an input gear, comprising:
a crankshaft including a shaft main body and an eccentric portion eccentric with respect to an axial center of the shaft main body;
a linking member including external teeth and configured to transmit rotation of the input gear to the crankshaft;
a carrier configured to rotatably support the crankshaft;
an oscillation gear oscillating and rotating due to rotation of the eccentric portion; and
an outer cylinder including internal teeth engaged with the oscillation gear,
wherein the carrier and the outer cylinder are coaxially and relatively rotate due to oscillation and rotation of the oscillation gear;
wherein the linking member is disposed in either one of a first position where the external teeth are engaged with the first input gear mounted in the gear device and a second position where the external teeth are engaged with the second input gear mounted in the gear device;
wherein the linking member is fixed to the shaft main body; and
wherein the linking member is disposed in either one of the first position and the second position by changing a fixed position of the linking member to the shaft main body in an extension direction of a central axis of relative rotation between the carrier and the outer cylinder.

7. A gear device in which either one of a first input gear and a second input gear is selectively mounted as an input gear, comprising:
a crankshaft including a shaft main body and an eccentric portion eccentric with respect to an axial center of the shaft main body;
a linking member including external teeth and configured to transmit rotation of the input gear to the crankshaft;
a carrier configured to rotatably support the crankshaft;
an oscillation gear oscillating and rotating due to rotation of the eccentric portion; and
an outer cylinder including internal teeth engaged with the oscillation gear,
wherein the carrier and the outer cylinder are coaxially and relatively rotate due to oscillation and rotation of the oscillation gear;
wherein the linking member is disposed in either one of a first position where the external teeth are engaged with the first input gear mounted in the gear device and a second position where the external teeth are engaged with the second input gear mounted in the gear device;
wherein the linking member is fixed to the shaft main body; and
wherein the linking member takes a first posture to be in the first position and a second posture to be in the second position, the second posture is oriented opposite to the first posture in an extension direction of a central axis of relative rotation between the carrier and the outer cylinder.

* * * * *